July 25, 1950 W. A. HASBANY 2,516,208
TRANSMISSION CONTROL
Filed March 8, 1946 23 Sheets-Sheet 1
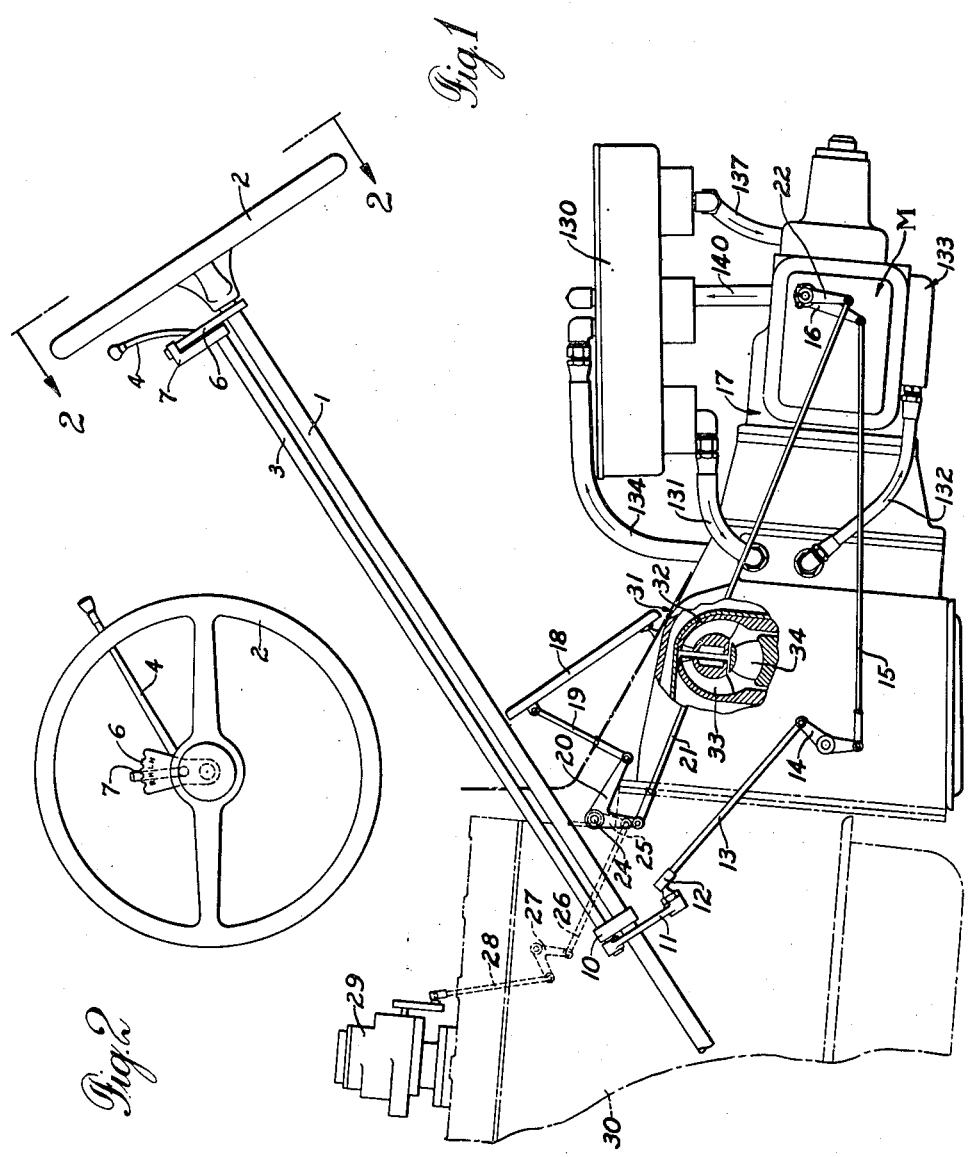
INVENTOR.
Woodrow A. Hasbany
BY
ATTORNEYS.

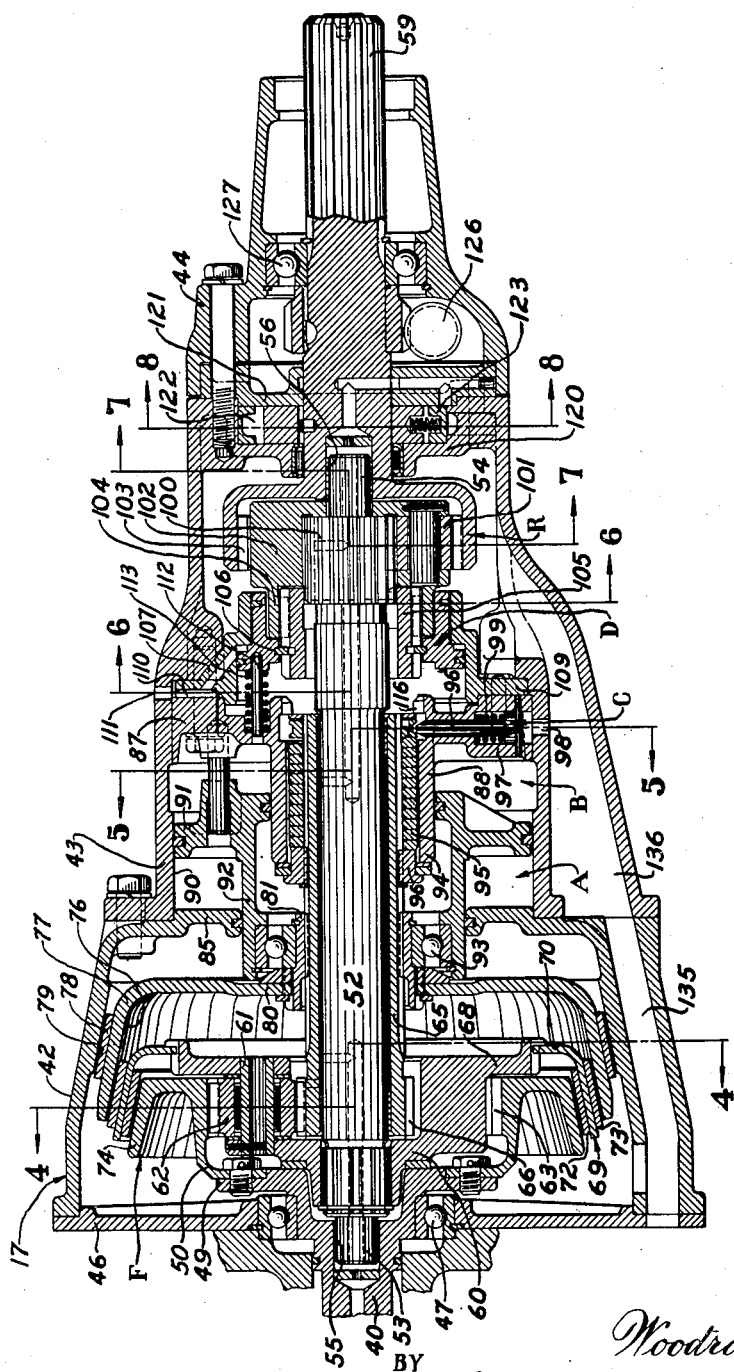

July 25, 1950 W. A. HASBANY 2,516,208
TRANSMISSION CONTROL
Filed March 8, 1946 23 Sheets-Sheet 3

INVENTOR.

July 25, 1950 W. A. HASBANY 2,516,208
TRANSMISSION CONTROL
Filed March 8, 1946 23 Sheets-Sheet 4

INVENTOR.
Woodrow A. Hasbany
BY
ATTORNEYS.

July 25, 1950    W. A. HASBANY    2,516,208
TRANSMISSION CONTROL
Filed March 8, 1946    23 Sheets-Sheet 5
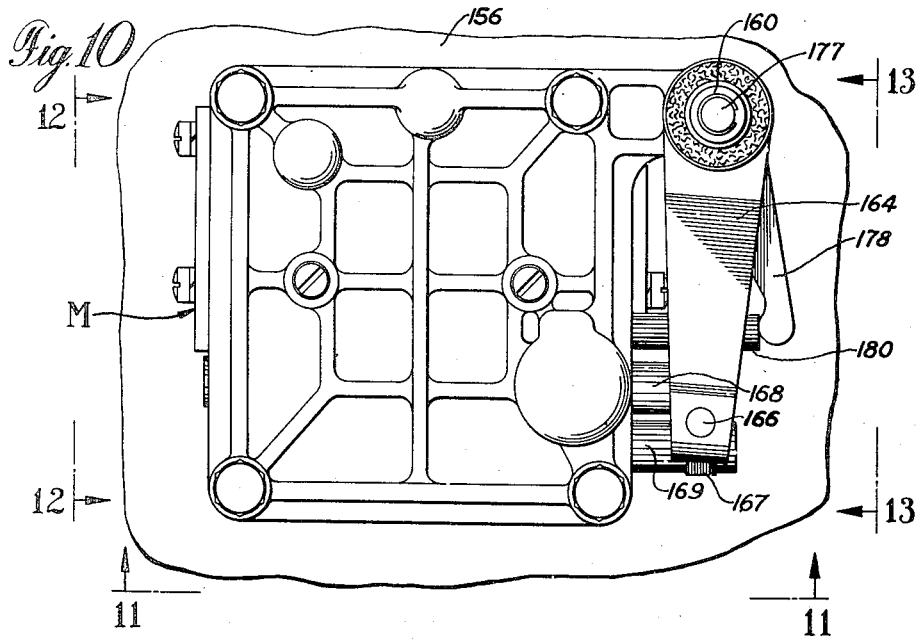
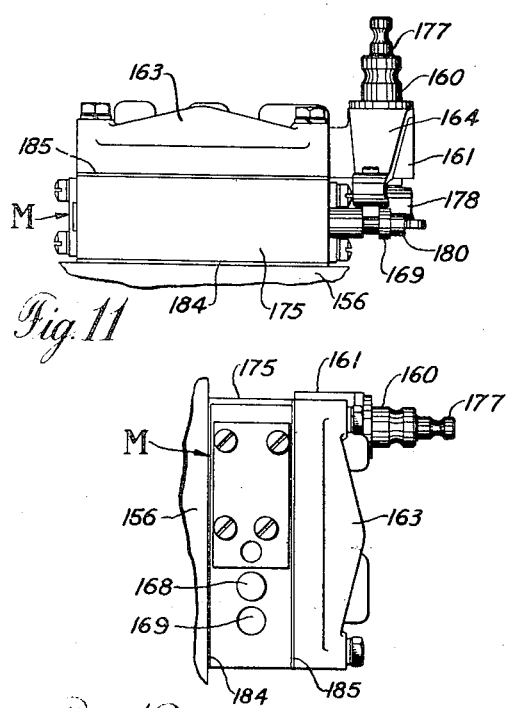
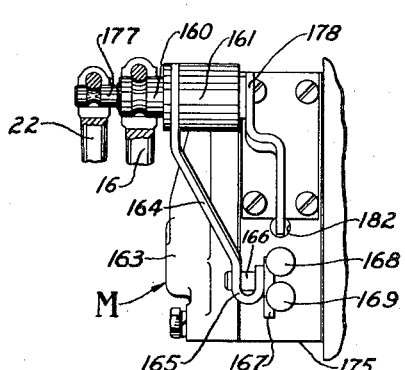
INVENTOR.
Woodrow A. Hasbany
BY
ATTORNEYS

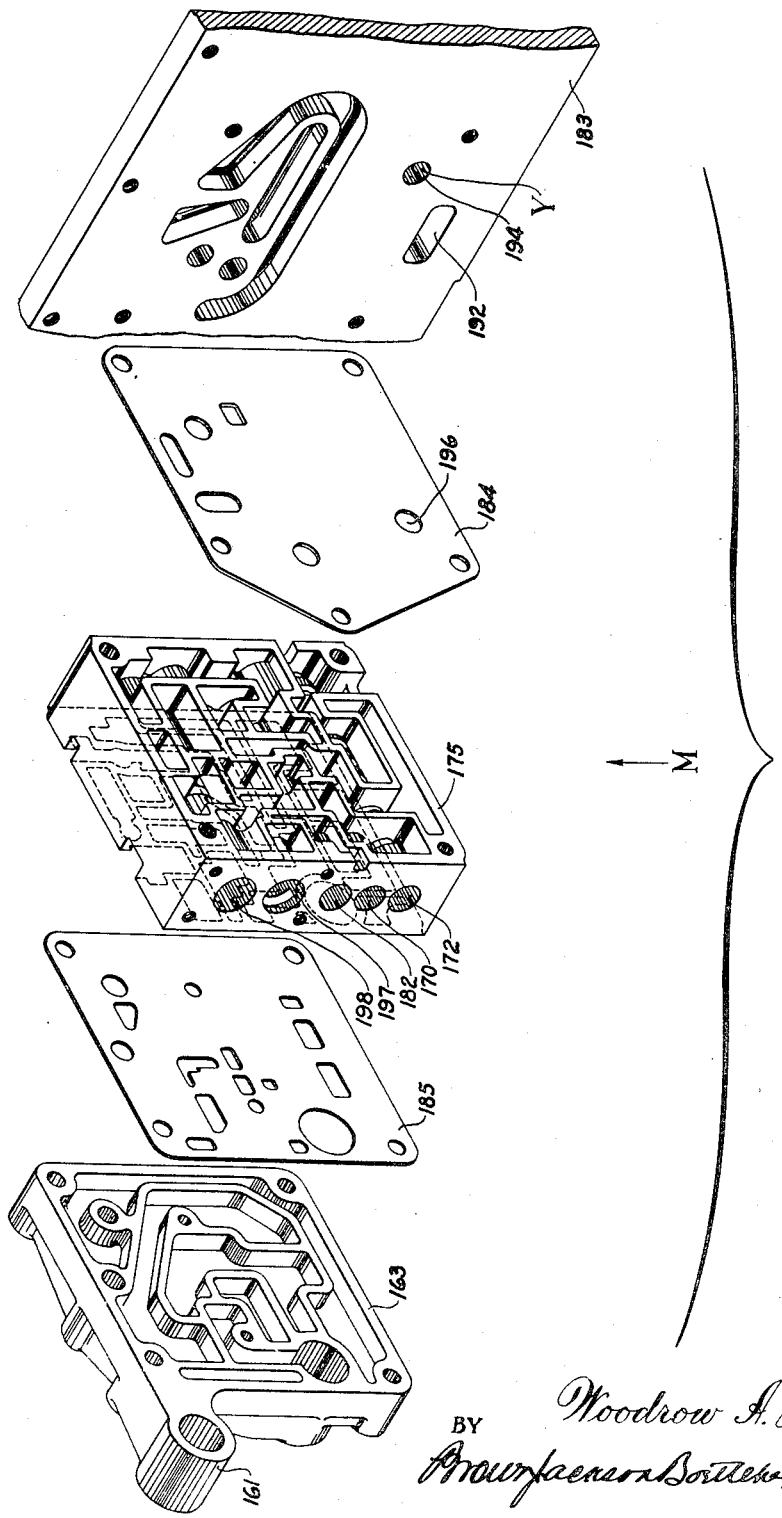

July 25, 1950 W. A. HASBANY 2,516,208
TRANSMISSION CONTROL
Filed March 8, 1946 23 Sheets-Sheet 7
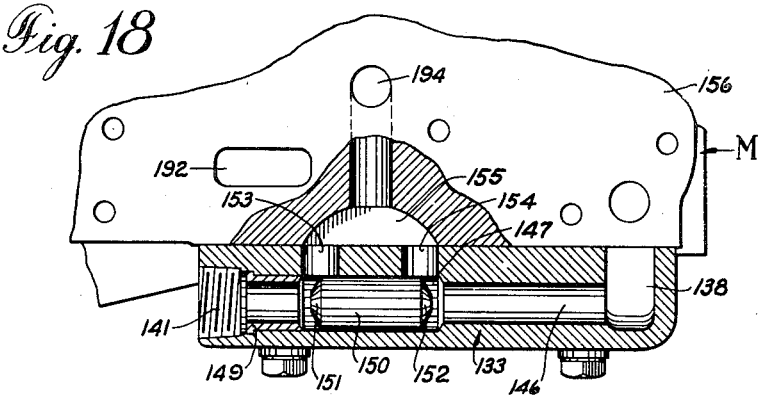
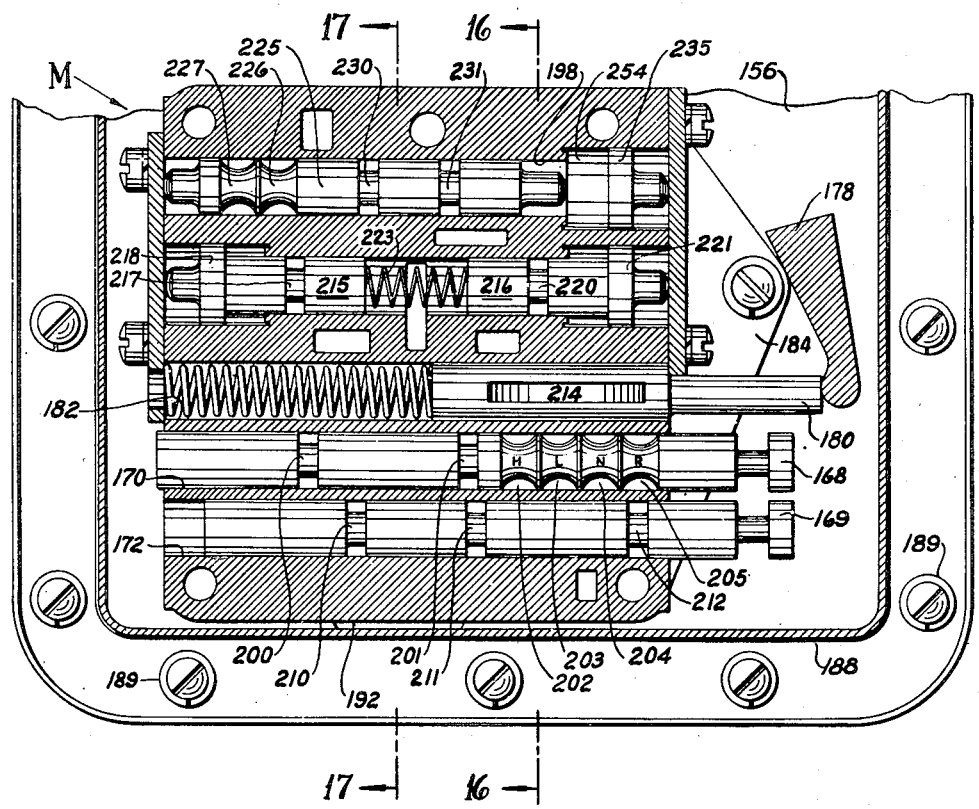
INVENTOR.
Woodrow A. Hasbany
BY
Buckhorn Jackson Boettcher Dienner
ATTORNEYS.

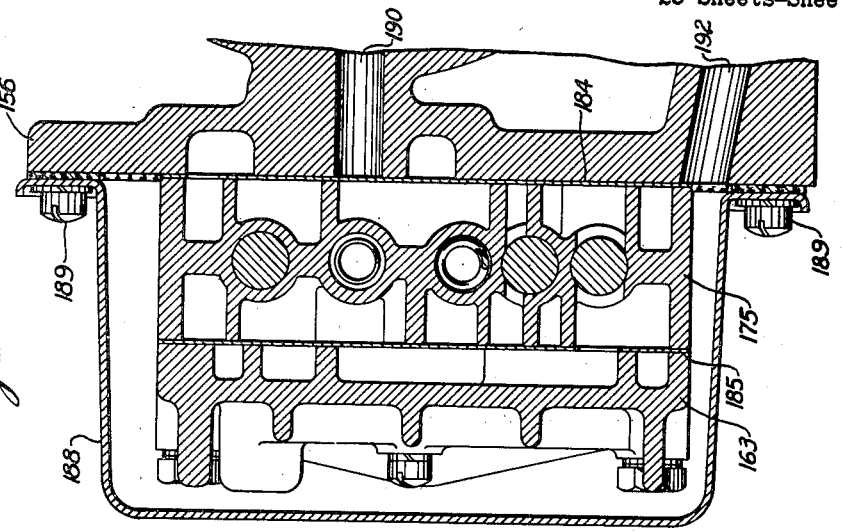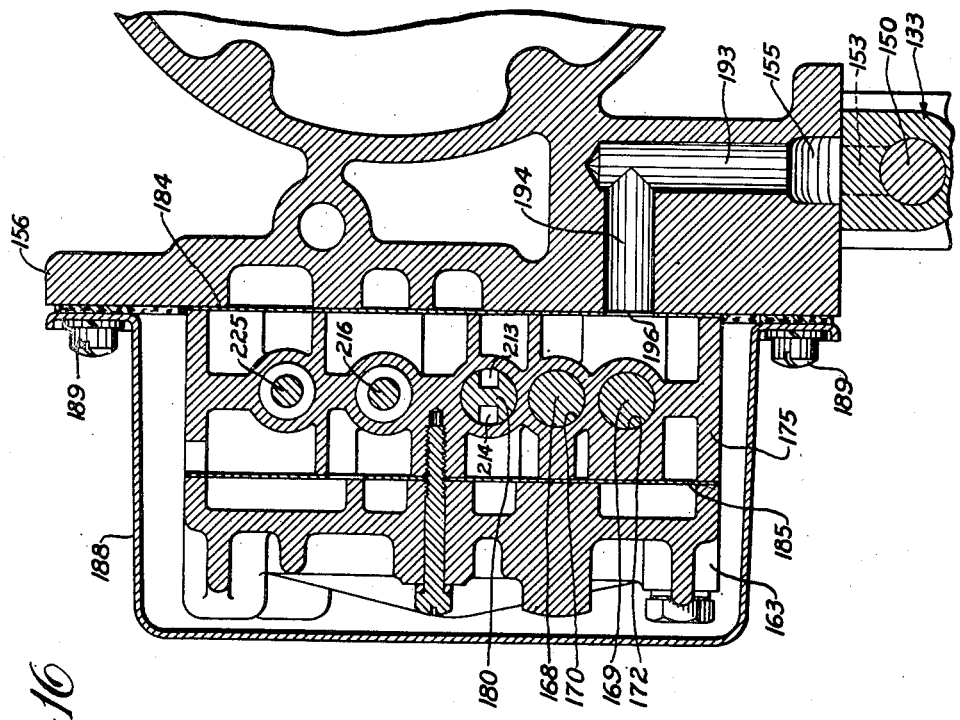

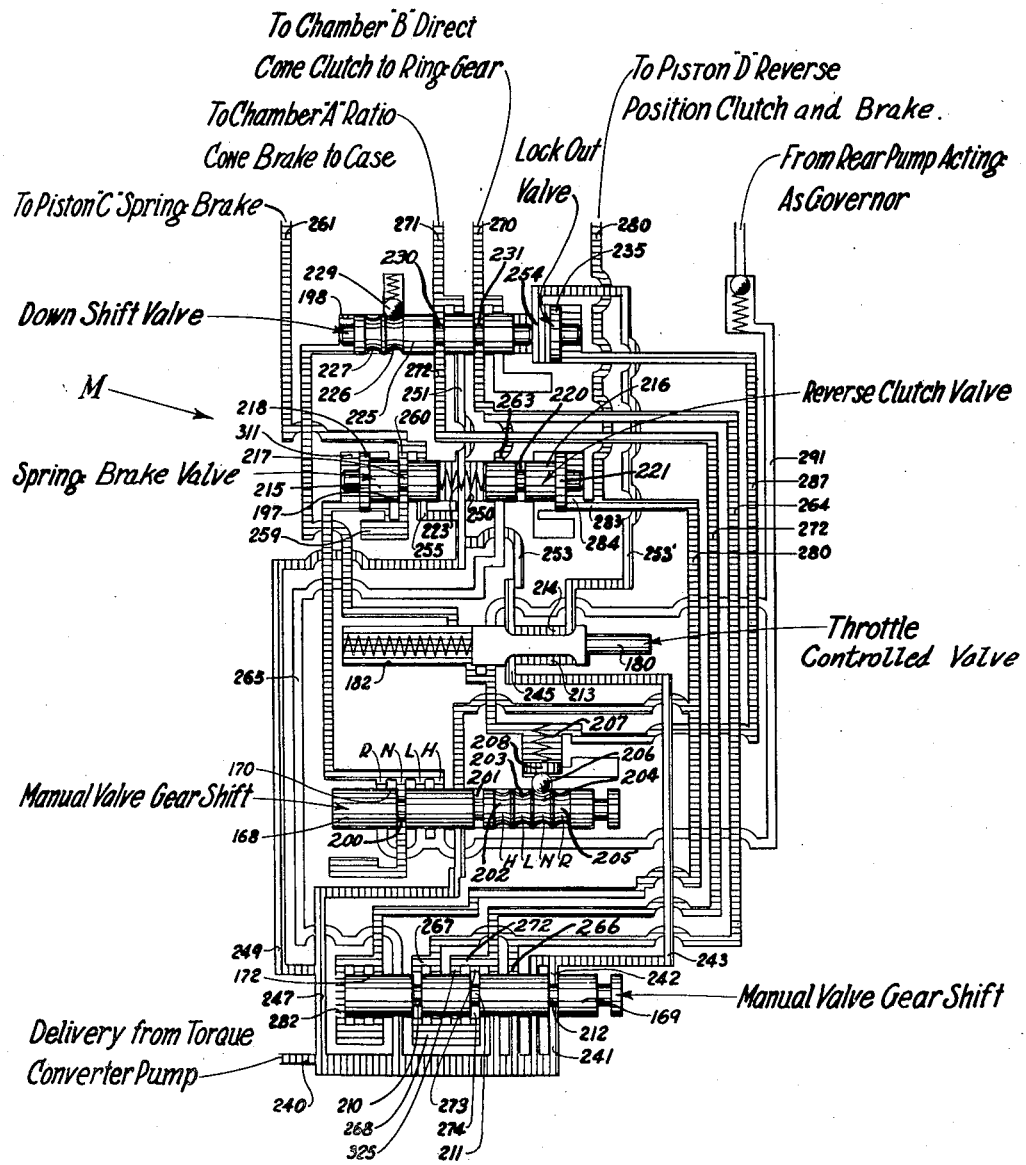

Engine Running-Transmission in Neutral-Throttle Open-Automobile Standing Still

Engine Running-Transmission in High-Throttle Closed-Automobile Standing Still

Engine Running-Transmission Shifted from High to Low-Throttle Open-Automobile Moving Engine Running - Transmission in Reverse - Throttle Closed - Automobile Standing Still July 25, 1950  W. A. HASBANY  2,516,208
TRANSMISSION CONTROL
Filed March 8, 1946  23 Sheets-Sheet 23

INVENTOR.
Woodrow A. Hasbany
BY
ATTORNEYS.

Patented July 25, 1950

2,516,208

UNITED STATES PATENT OFFICE 2,516,208

TRANSMISSION CONTROL

Woodrow A. Hasbany, South Bend, Ind., assignor to The Studebaker Corporation, South Bend, Ind., a corporation of Delaware Application March 8, 1946, Serial No. 652,860

49 Claims. (Cl. 74—754)

My present invention relates to an improvement in transmission control means.

My present invention is particularly adapted for use with a transmission having gear means providing forward drive between drive and driven shafts and torque transmitting means associated with the gear means for selectively effecting the desired forward ratio drive, and a second gear means which together with a selected gear ratio of forward drive gear means provides for reverse drive with clutch means being associated with the second gear means for selectively effecting operation of the reverse gearing.

More particularly the control means of my invention has adaptability for use with transmissions of the type having gear means providing low and high ratio drives between drive and driven shafts thereof and having suitable torque transmitting means which may be selectively actuated to effect, selectively, low or high ratio drive through the transmission. Further the control means of my invention has utility with a transmission as aforesaid in which the transmission comprises a suitable form of brake means or equivalent mechanism adapted to be conditioned for operation to prevent breaking of the driving connection torque line between the drive and driven shafts of the transmission while a shift from low ratio drive to high ratio drive or vice versa, is being effected by actuation of the torque transmitting means.

Transmissions of the above character are known in the art, and for purposes of describing my present invention I have chosen to illustrate and describe the transmission of an application of Harold E. Churchill, Paul V. Haigh, and Harold C. Zander, Serial No. 644,828, filed February 1, 1946, and which issued April 25, 1950 as Patent No. 2,505,171, for Transmission. In the transmission of the application last referred to, as well as in other known forms of transmission, suitable gear means is provided for effecting reverse drive and the control means of my present invention has further application for selectively controlling the actuation of such gear means.

It is an object of my invention to provide control means for a transmission for an automotive vehicle in which actuation of the transmission may be effected without the use of conventional clutch mechanism presently provided for breaking the driving connection between drive and driven shafts of the transmission when a shift is to be made.

A further object is to provide control means comprising manually operable selector means for effecting a desired drive through the transmission, and in which the change in the driving ratio of the transmission may be effected without breaking of the driving connection of the drive and driven shafts of the transmission.

A further object is to provide control means comprising manually operable selector means for effecting high ratio drive through the transmission and manually operable throttle controlled means adapted to effect a change from high ratio drive to low ratio drive through the transmission with the selector means in position to effect said high ratio drive.

A further object is to provide control means as last aforesaid adapted when a change is effected by actuation of said throttle controlled means to provide a change from high ratio drive to low ratio drive to prevent breaking of the driving connection between the drive and driven shafts of the transmission.

A further object of my invention is to provide control means adapted to control flow of fluid under pressure to a transmission to control actuation of the same as above described.

A further object is to provide control means adapted to control the flow of fluid under pressure derived from pump means driven by the drive shaft of the transmission, or by the tail shaft or driven shaft of the transmission, so that with the engine of the vehicle running or with the vehicle being pushed or moved in a forward direction, fluid under pressure is available for effecting actuation of the transmission.

A further object is to provide control means adapted to control the flow of fluid under pressure delivered from pump means driven by the tail or driven shaft of a transmission with the vehicle moving forwardly so that with the engine of the vehicle dead it may be started through the transmission by pushing or moving the vehicle forwardly.

A further object is to provide control means for actuating a transmission for reverse drive for an automotive vehicle operative to first establish a neutral through the transmission before actuating the same for reverse drive.

A further object of my invention is to provide control means for a transmission as aforesaid having means including a manually shiftable selector means for effecting neutral for the transmission or to selectively control the actuation of the torque transmitting means to effect either high or low ratio drive through the gear means of the transmission, and means including manually operable throttle controlled means adapted in a predetermined position thereof for preventing actuation of the selector means to effect either low or high ratio drive through the transmission.

A further object of my invention is to provide means associated with the manually shiftable selector means adapted to be automatically positioned by manual manipulation of the selector means to effect actuation of the torque transmitting means in accordance with the manipulation of the selector means, and means including manually operable throttle controlled means adapted when the throttle means is in closed position, i. e., with the engine of the vehicle idling to maintain the means associated with the selector means in its position effecting actuation of the torque transmitting means dictated by the selected position of the selector means.

A further object of my invention is to provide control means as last aforesaid adapted when the throttle controlled means is opened to condition the brake means for preventing breaking of the driving connection between the drive and driven shafts upon actuation of the torque transmitting means to effect low to high ratio drive or vice versa, for operation.

A further object of my invention is to provide control means as last aforesaid adapted when the throttle controlled means is opened and with the vehicle moving forwardly to effect shifting of the automatically shiftable means associated with the selector means to a position in which the torque transmitting means continues to effect the selected drive, but which automatically shiftable means is positioned to effect upon manipulation of the selector means actuation of the torque transmitting means, to effect a change from low to high drive ratio, or vice versa.

A further object of my invention is to provide control means as last aforesaid adapted when the throttle controlled means is opened and with the vehicle moving forwardly to condition the brake means for preventing breaking of the driving connection between the drive and driven shafts upon actuation of the torque transmitting means to effect low to high ratio drive, or vice versa, for operation.

A further object of my invention is to provide a control means for use with a transmission as above described having manually shiftable selector means positionable for effecting high ratio drive between drive and driven shafts of the transmission, and means including throttle controlled means adapted when the throttle means is shifted to a predetermined open position to effect shifting of the means associated with the selector means for automatically effecting actuation of the torque transmitting means to provide a shift from high ratio drive to low ratio drive without manipulating the manually operable selector means.

A further object of my invention is to provide a transmission control means as last aforesaid adapted when the throttle controlled means is actuated to effect a change from high ratio drive to low ratio drive to condition for operation the brake means of the transmission for preventing breaking of the driving connection between the drive and driven shafts upon actuation of the torque transmitting means to effect a high to low ratio drive for operation.

A further object is to provide control means having manually shiftable selector means adapted to be positioned to effect reverse drive for the transmission and including means comprising manually operable throttle means adapted when in its closed position i. e., with the engine of the vehicle idling, to maintain the automatic shiftable means associated with the selector means in position for effecting actuation of a clutch and brake means dictated by the selected position of the selector means to effect reverse drive.

It is a further object of my invention to provide control means adapted to initially effect actuation of the clutch and brake means for conditioning the gear means providing for reverse drive and subsequently effect the actuation of the torque transmitting means of the gear set providing for forward drive to complete a reverse drive through the transmission. In this manner the driving connection through the transmission is broken before engagement of the brake of the clutch and brake means associated with the gear set providing for reverse drive until that brake has been caused to be actuated and before connecting the reverse drive gear set with the gear means normally providing for forward drive for the transmission.

In order to achieve the above objects I propose to provide a control means comprising manually shiftable selector means for selectively effecting the actuation of a transmission, and manually operable throttle controlled means adapted in the neutral position of said selector means to prevent shifting of the selector means if the throttle controlled means is actuated to open position. The control means further comprises what I have hereinafter referred to as a downshift valve means positionable automatically by a fluid under pressure in response to the selective positioning of the selector means. The downshift means is controlled by the selector means and is positionable by actuation of the same to effect selectively either low or high ratio drive through the transmission or for reverse drive. The control means of my invention further comprises a brake valve means which is adapted to control conditioning of the brake means for preventing breaking of the driving connection between the drive and driven shafts in the manipulation of the selector means to effect a change from low ratio drive to high ratio drive or vice versa. The control means further comprises reverse clutch valve means operable for effecting disengagement of the drive and driven shafts of a transmission until the reverse gearing mechanism thereof has been rendered operative by clutch means associated therewith and which reverse clutch valve means is subsequently operable to effect control of the torque transmitting means of the forward drive gear mechanism for completing a driving connection through the transmission to provide reverse drive for the vehicle.

In the control means of my present invention I have also provided a lockout valve means adapted in the actuation of the transmission for neutral or for low ratio drive to prevent movement of the downshift valve from a position other than that dictated by the provision of the manually operable selector means.

Other objects and advantages of my invention will appear from the detail description.

Now, in order to acquaint those skilled in the art with the manner of constructing and utilizing a control means in accordance with my invention I shall describe in connection with the accompanying drawings a preferred embodiment of my invention.

In the drawings:

Figure 1 is a side elevational view of a transmission with which my present invention has been embodied and showing the arrangement of the transmission and control means with an internal combustion engine throttle or accelerator means, and steering apparatus of an automobile;

Figure 2 is a plan view of the steering wheel shown in Figure 1 taken on the line 2—2 of Figure 1 looking in the direction indicated by the arrows;

Figure 3 is a sectional view through the vertical longitudinal medial plane of the transmission of Figure 1, which transmission provides for two forward gear ratios hereinafter referred to as high and low, and one reverse gear ratio, and is representative of a form of transmission with which my present invention may be utilized.

Figure 10 is a side elevational view of a hydraulic control valve means constructed in accordance with my invention for controlling fluid under pressure to effect operation of the transmission of Figure 3 with the enclosing cover for the control valve means removed;

Figure 11 is a bottom view of the control valve of Figure 10 taken on the line 11—11 of Figure 10 looking in the direction indicated by the arrows;

Figure 12 is a left hand end view of the control valve of Figure 10 taken on line 12—12 thereof, and looking in the direction indicated by the arrows;

Figure 13 is a right hand end view of the control valve of Figure 10, taken substantially on line 13—13 of the latter figure and looking in the direction indicated by the arrows;

Figure 14 is an exploded perspective view of the several elements making up the housing and control valve block of the control valve means shown in Figure 10;

Figure 15 is a substantially vertical longitudinal sectional view through the control valve means of Figures 10 through 14 and enclosing cover therefor;

Figure 16 is a transverse vertical sectional view of the control valve means taken on the line 16—16 of Figure 15, looking in the direction indicated by the arrows;

Figure 17 is a transverse vertical sectional view of the control valve means taken substantially on line 17—17 of Figure 15, looking in the direction indicated by the arrows;

Figure 18 is a detail sectional view of a valve arrangement for controlling flow of fluid under pressure from either one or both of two pump means to the valve control means of my invention for effecting control of the one typical form of transmission herein disclosed;

Figure 4:
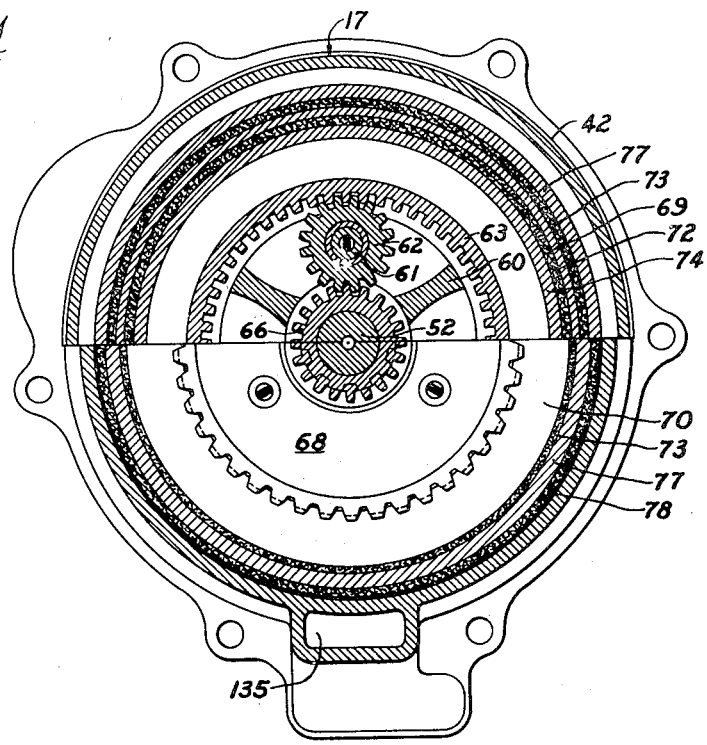
Figure 4 is a vertical sectional view taken substantially on line 4—4 of Figure 3 looking in the direction indicated by the arrows.
Figure 5:
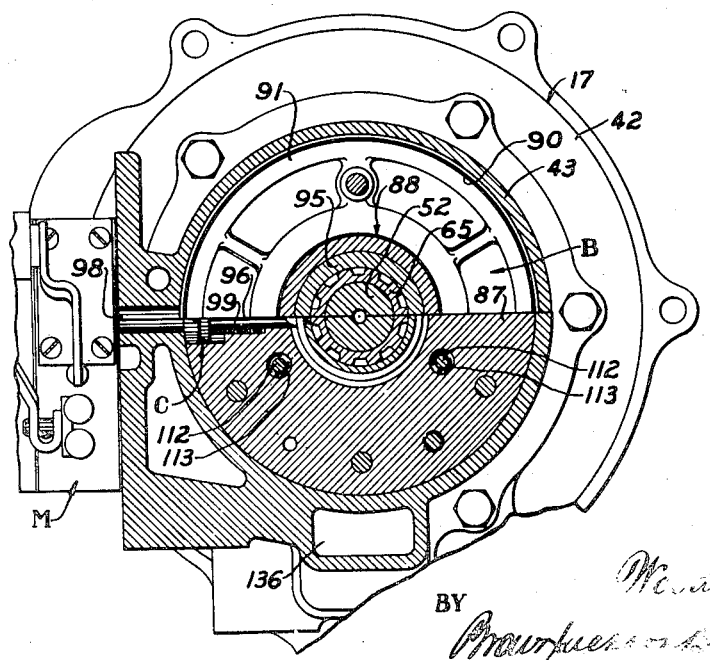
Figure 5 is a vertical sectional view taken substantially on the line 5—5 of Figure 3 looking in the direction indicated by the arrows.
Figure 6:
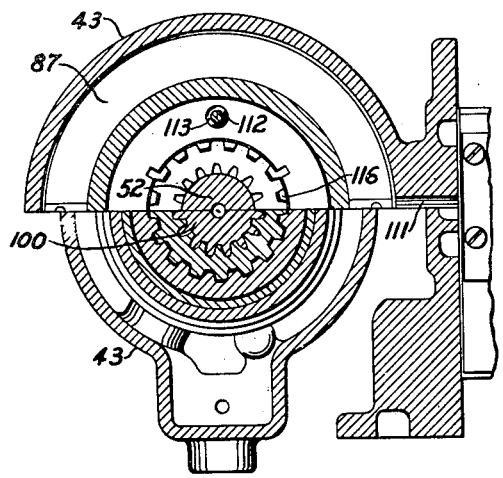
Figure 6 is a vertical sectional view taken substantially on the line 6—6 of Figure 3 looking in the direction indicated by the arrows.
Figure 9:
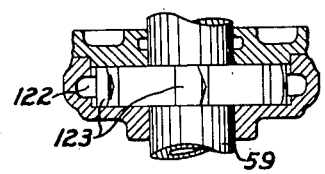
Figure 9 is a plan view of the rotor of the pump shown in Figure 8, with a portion of the casing for the pump being shown in section.
Figure 7:
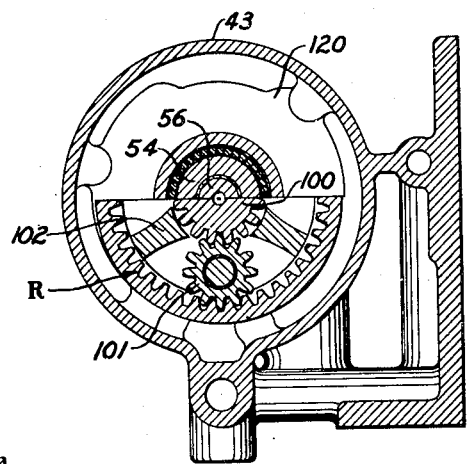
Figure 7 is a vertical sectional view taken substantially on the line 7—7 of Figure 3 looking in the direction indicated by the arrows.
Figure 8:
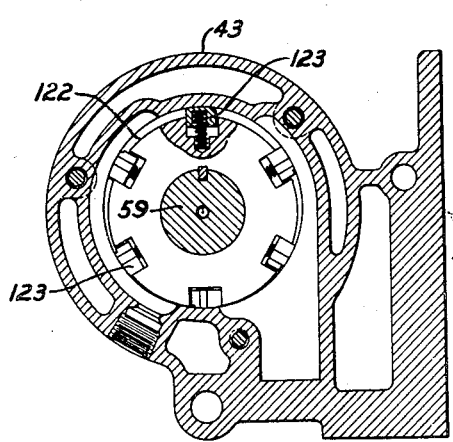
Figure 8 is a detail vertical sectional view taken substantially on the line 8—8 of Figure 3 looking in the direction indicated by the arrows.
Figure 20:
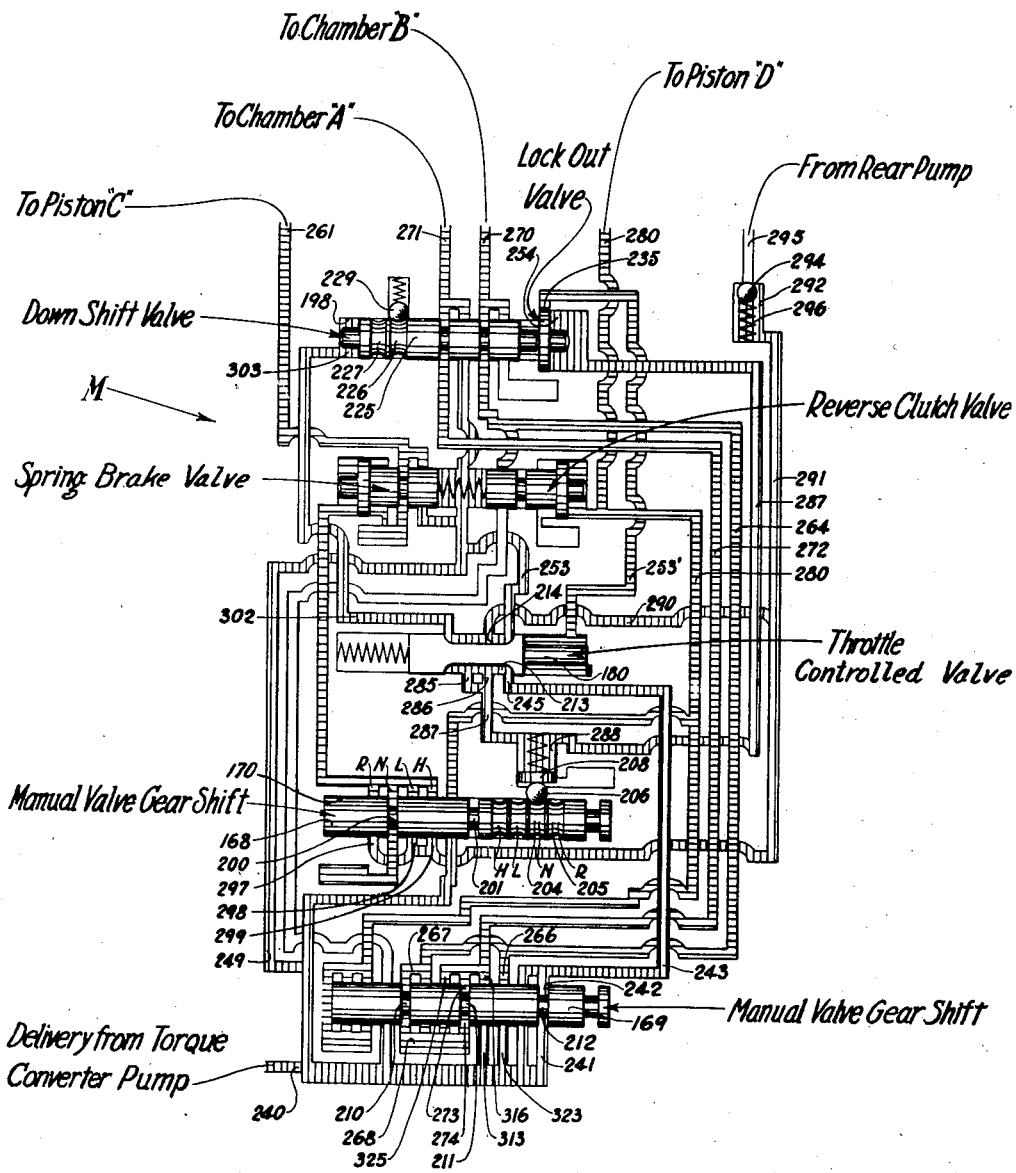
Figure 21:
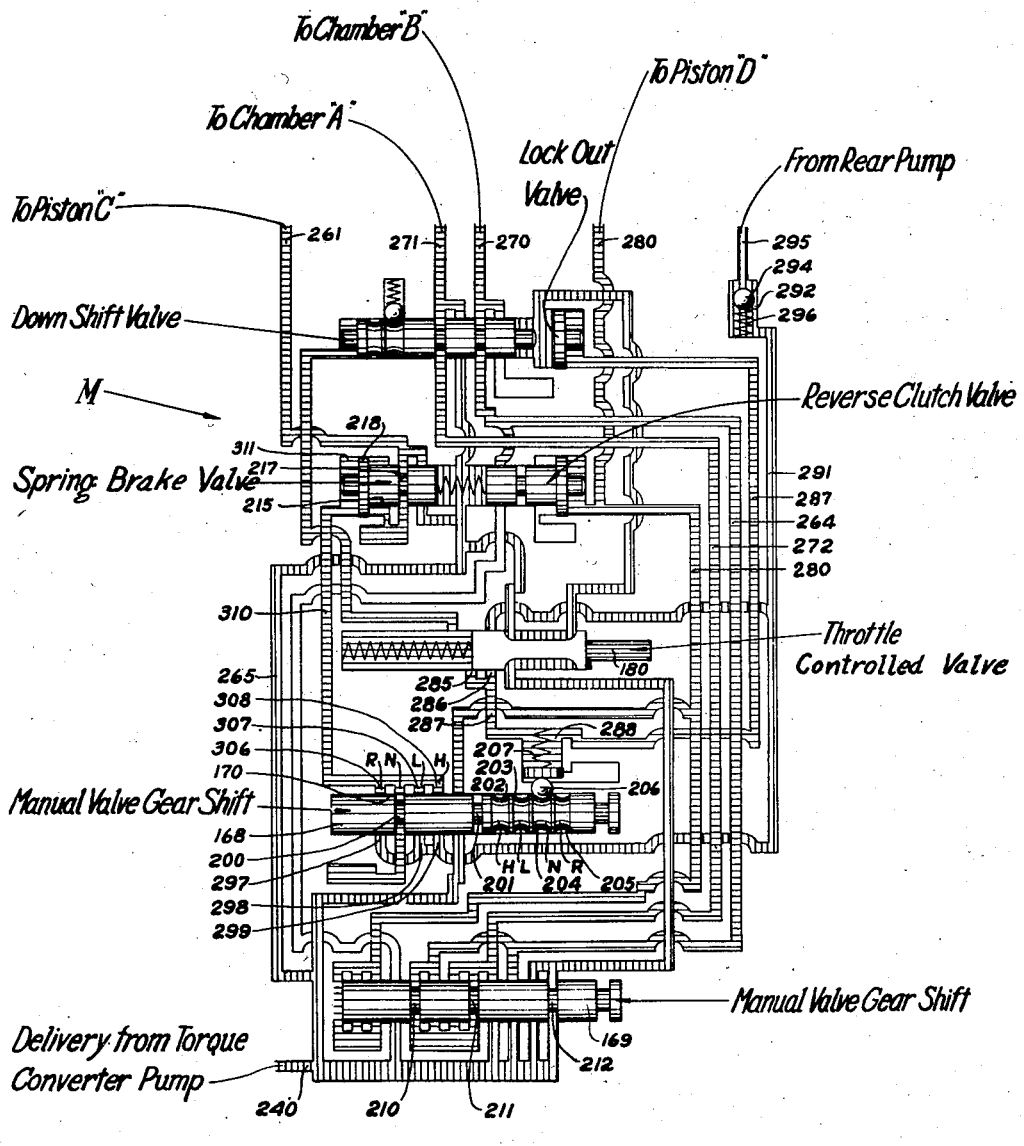
Figure 22:
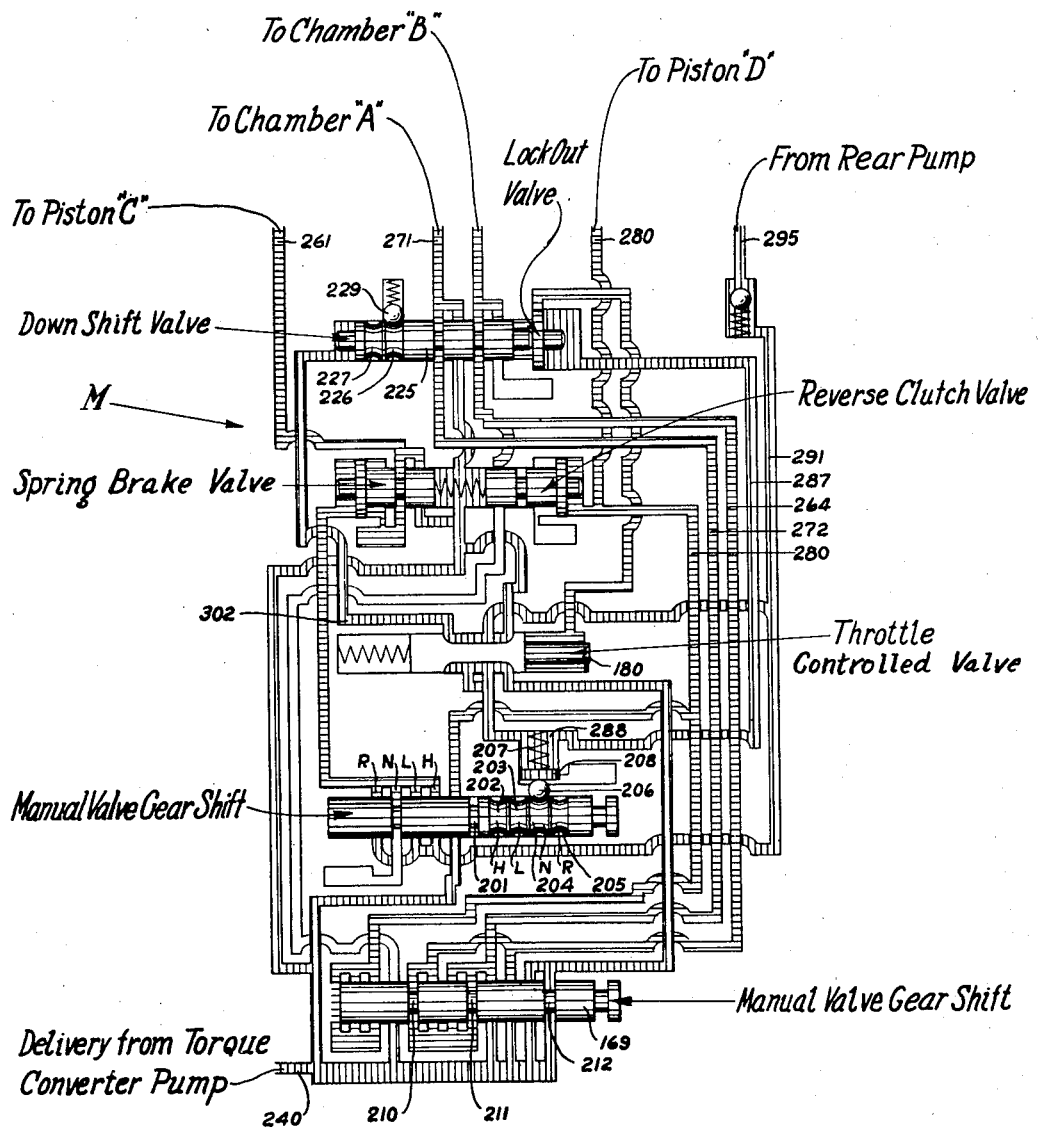
Figure 23:
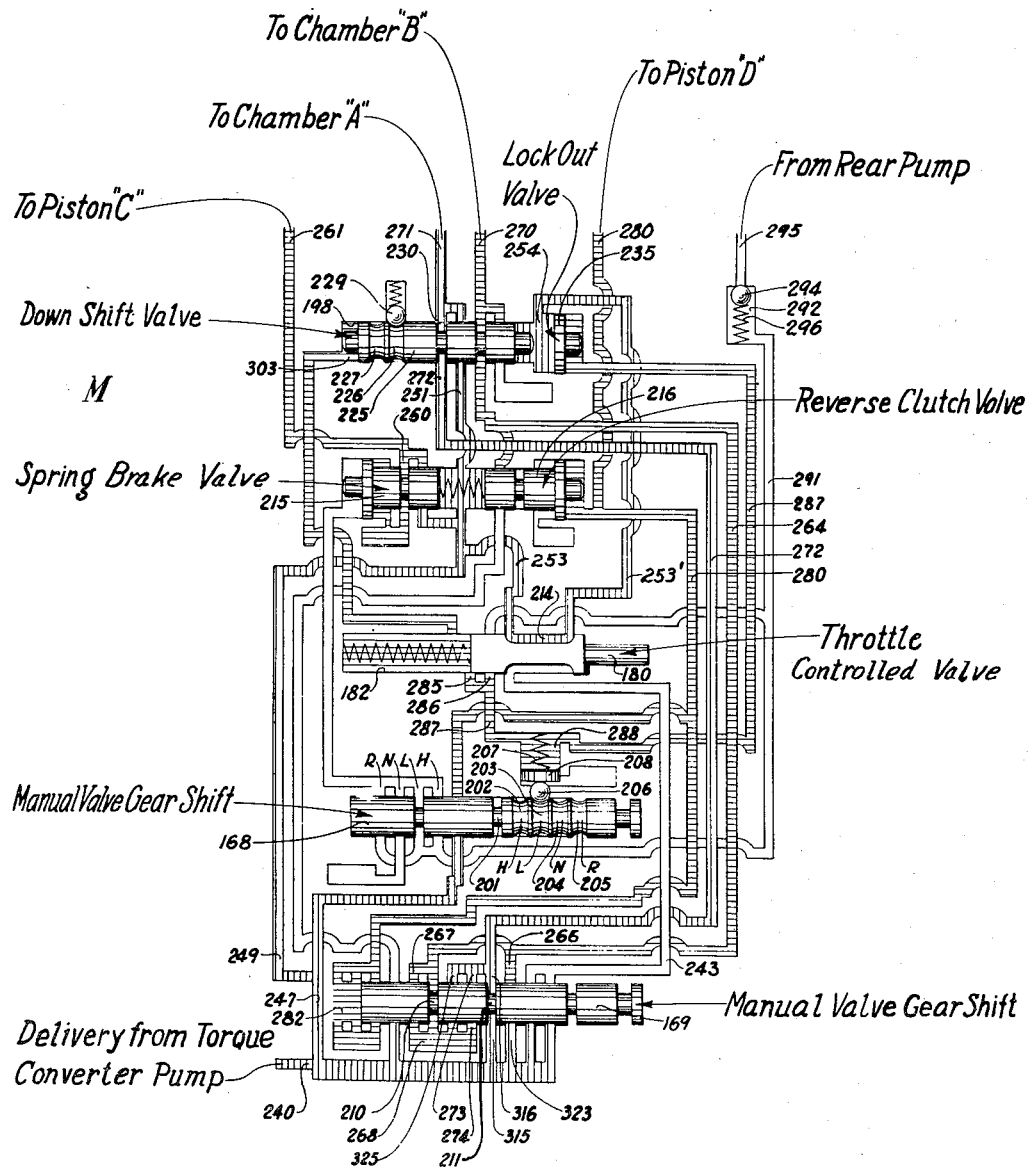
Figure 24:
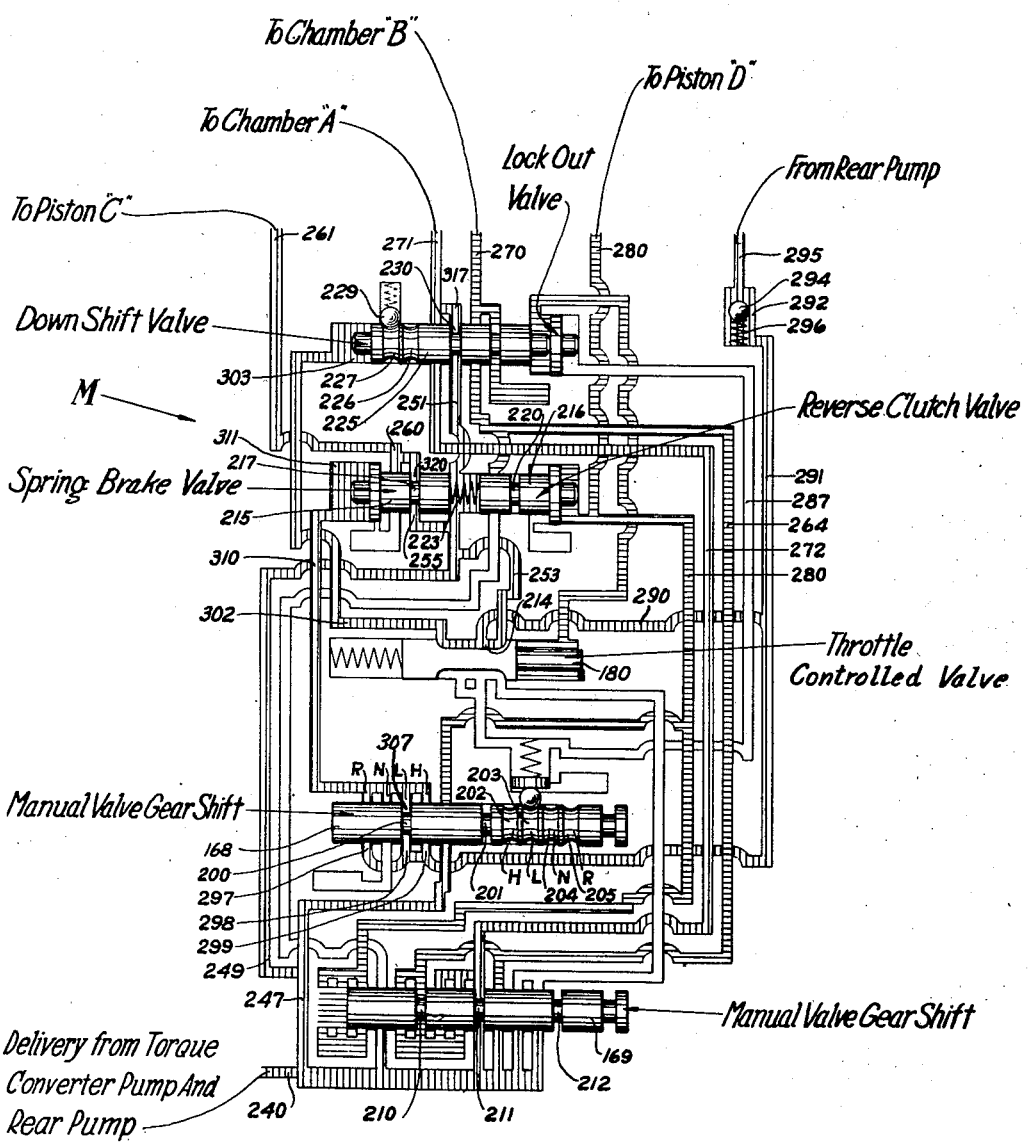
Figure 25:
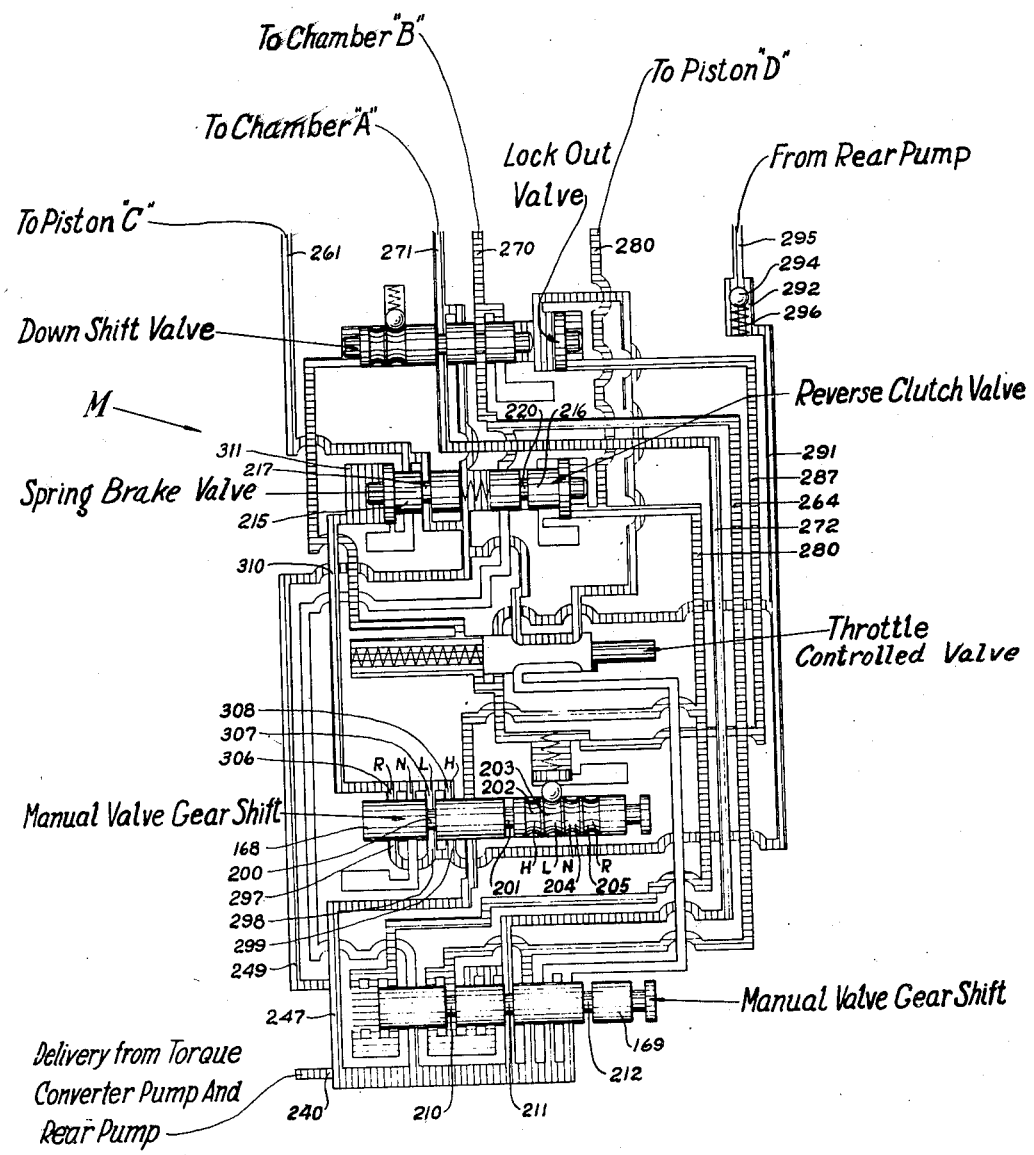
Figure 26:
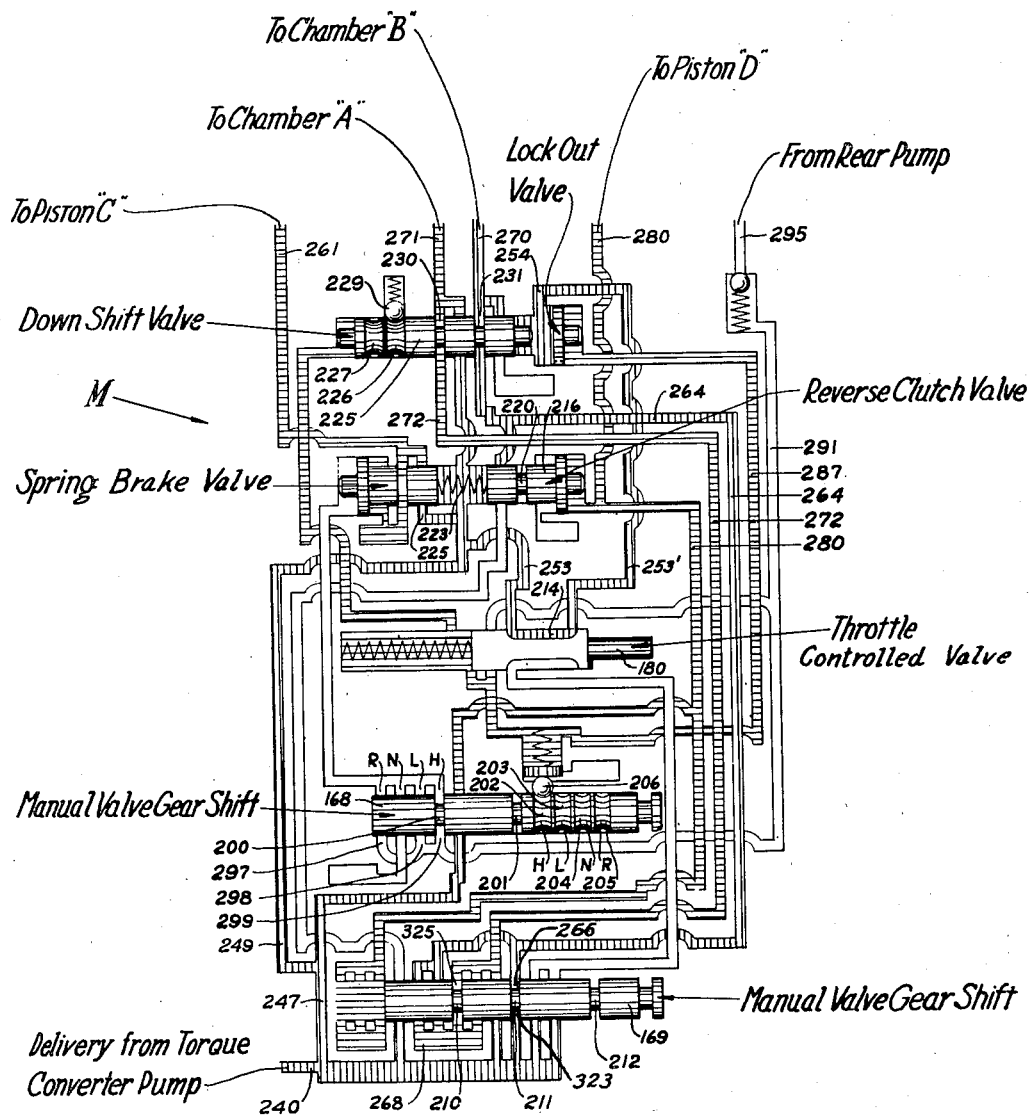
Figure 27:
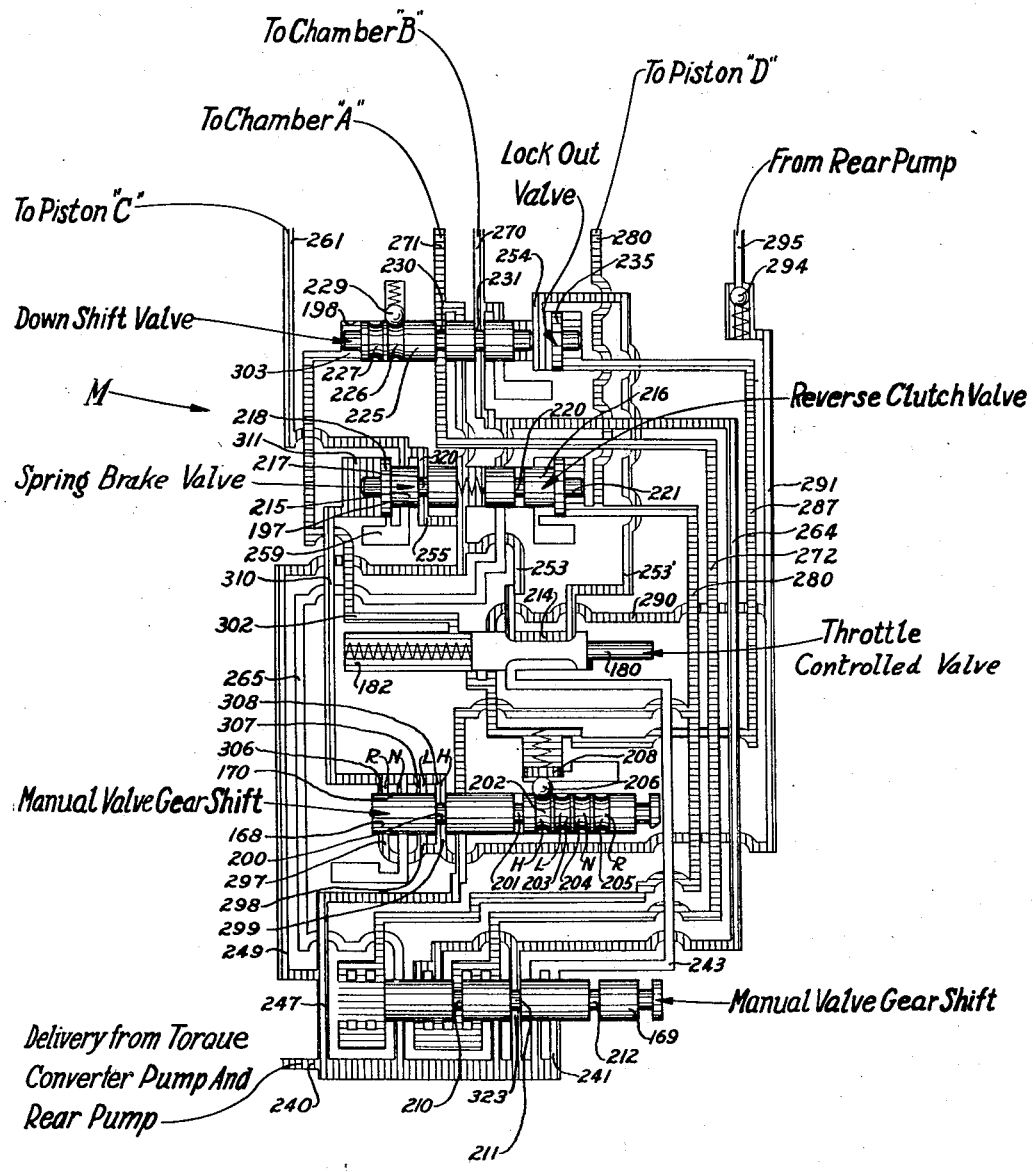
Figure 28:
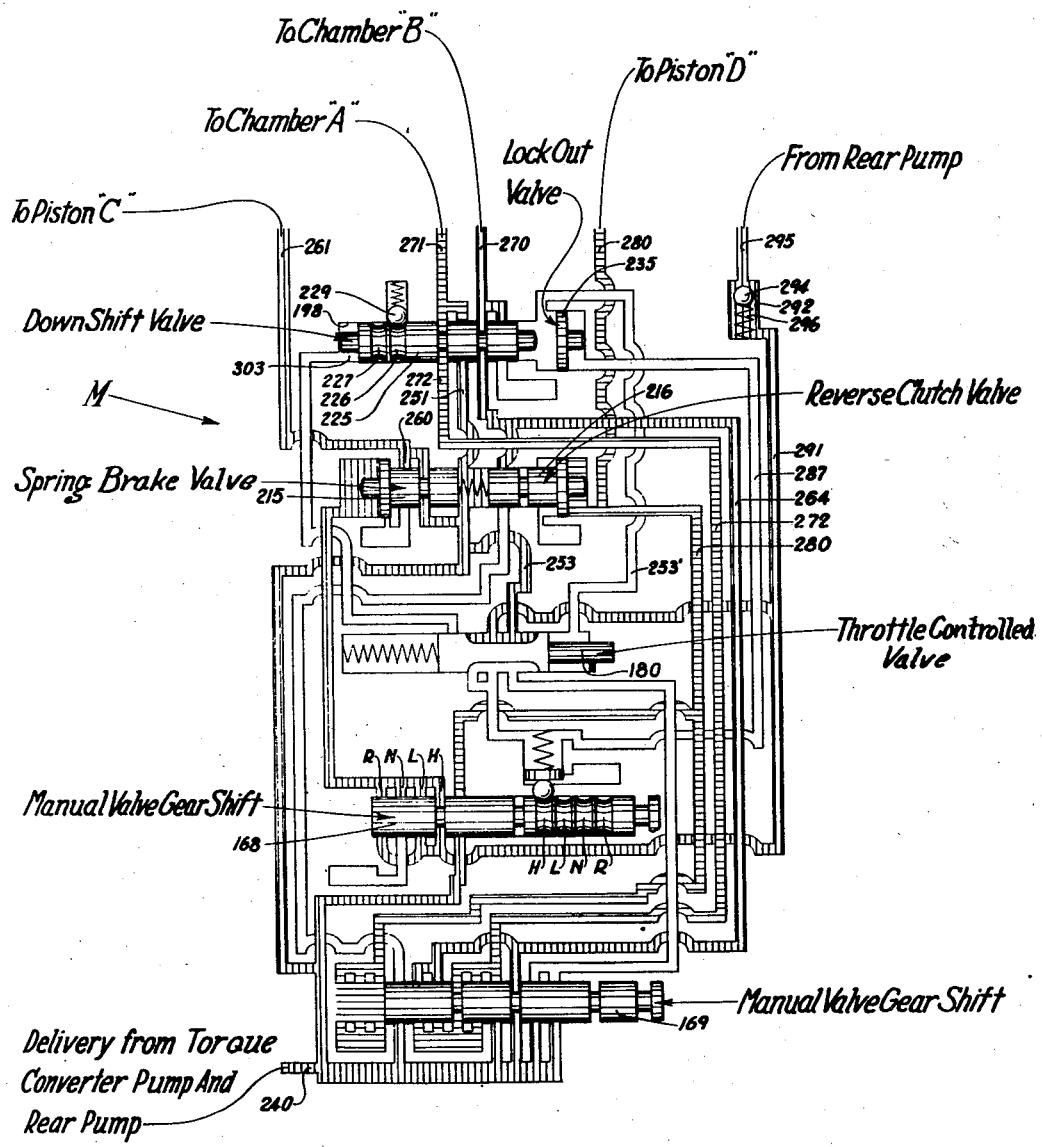
Figure 29:
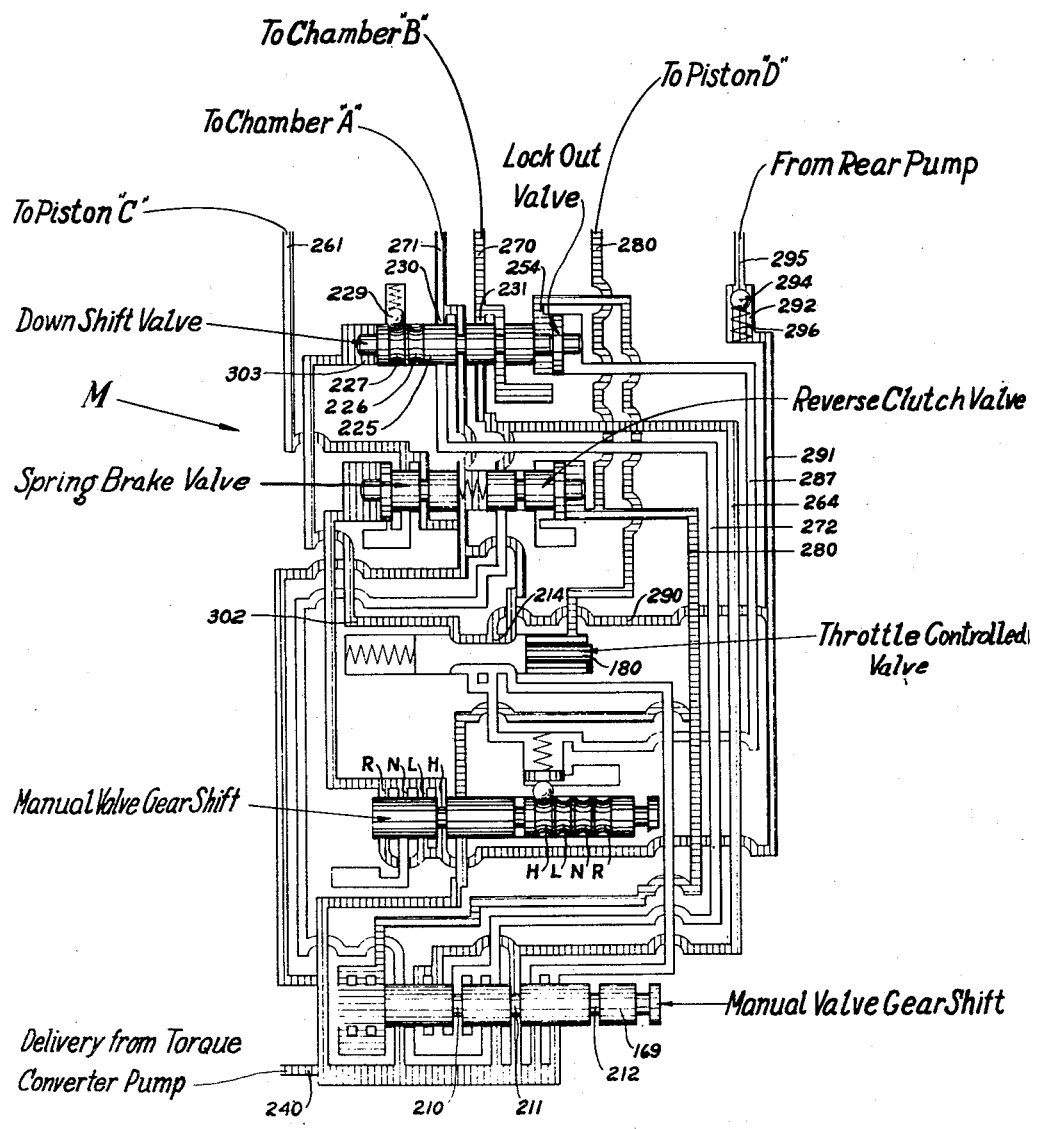
Figure 30:
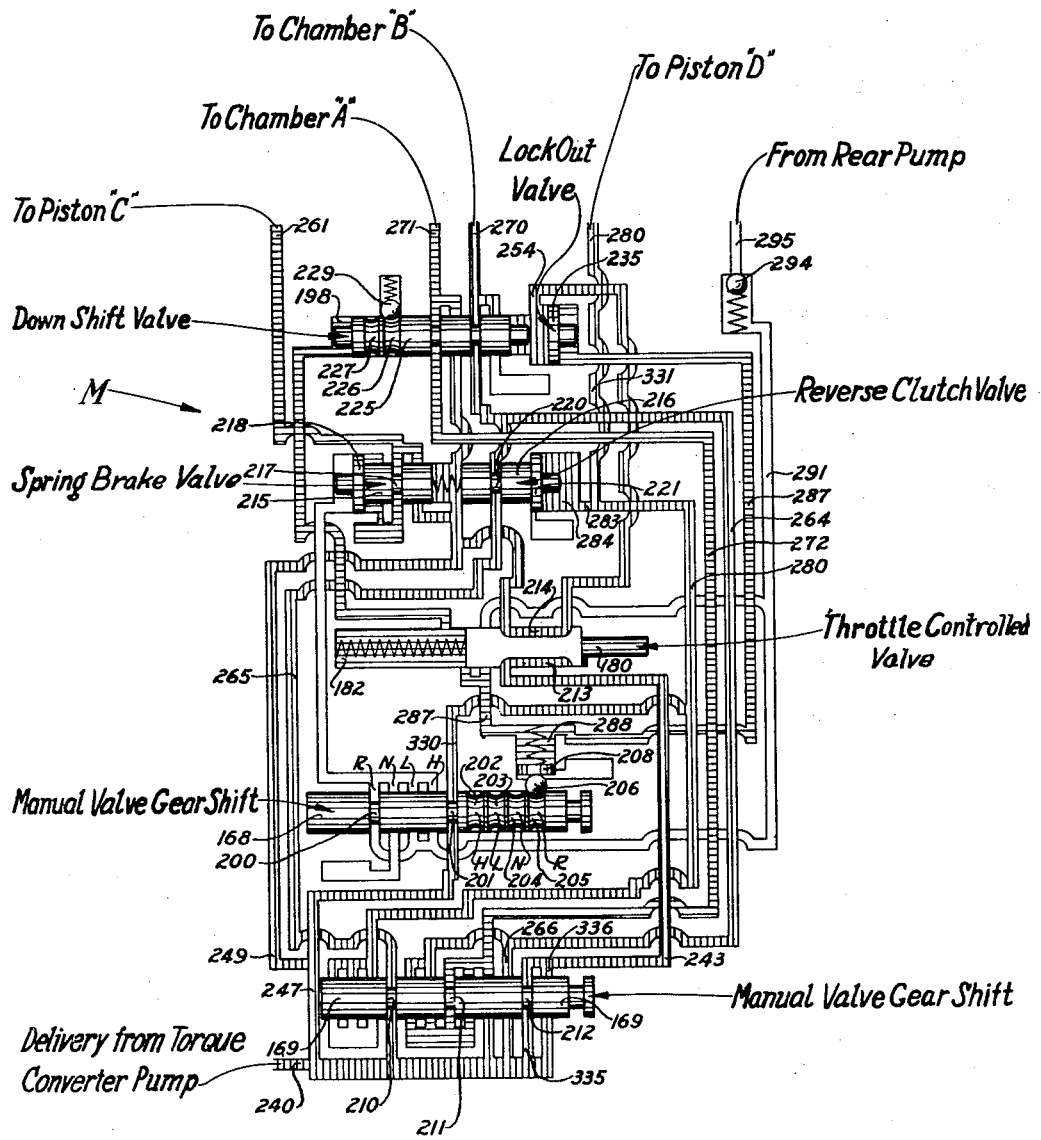
Figure 31:
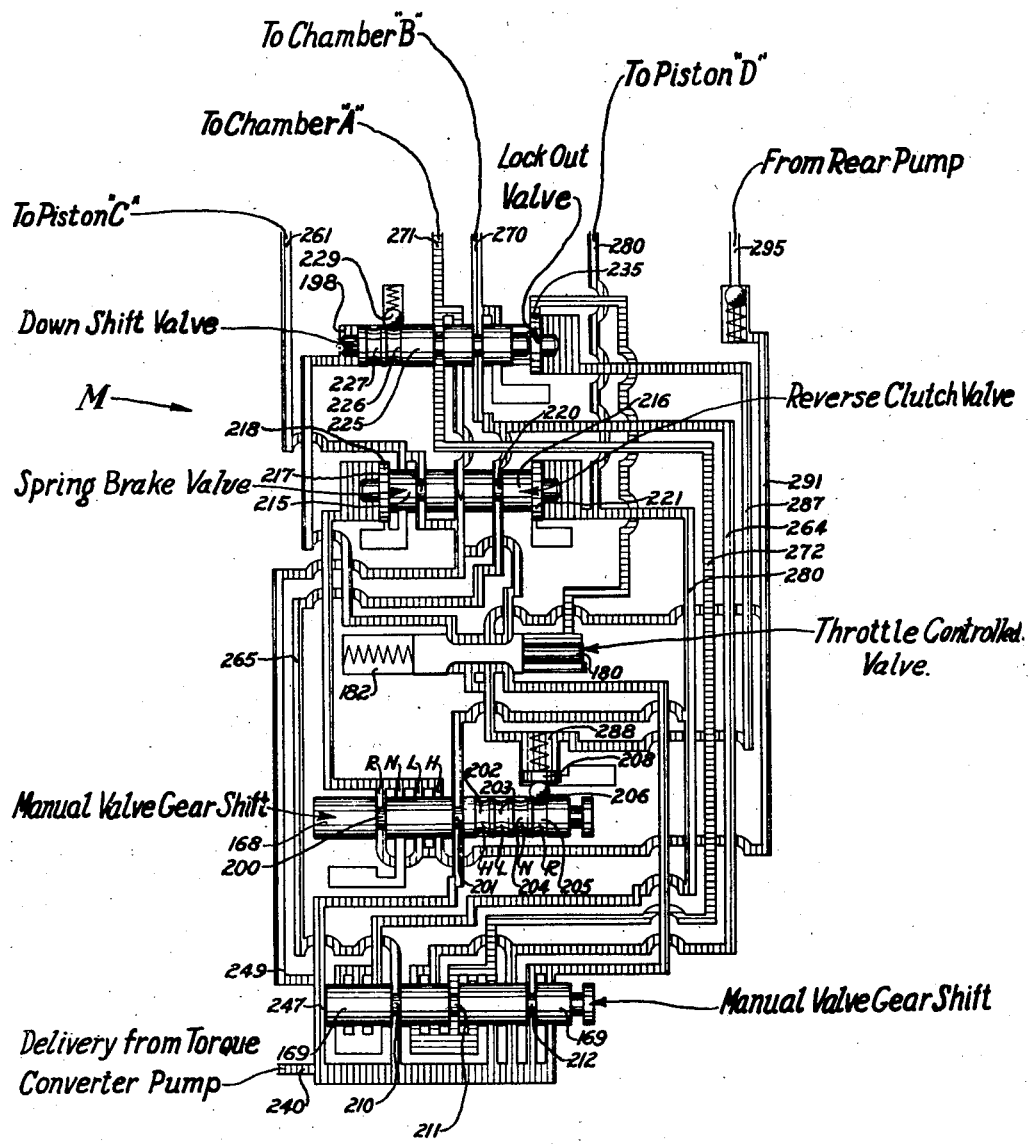
Figure 32:
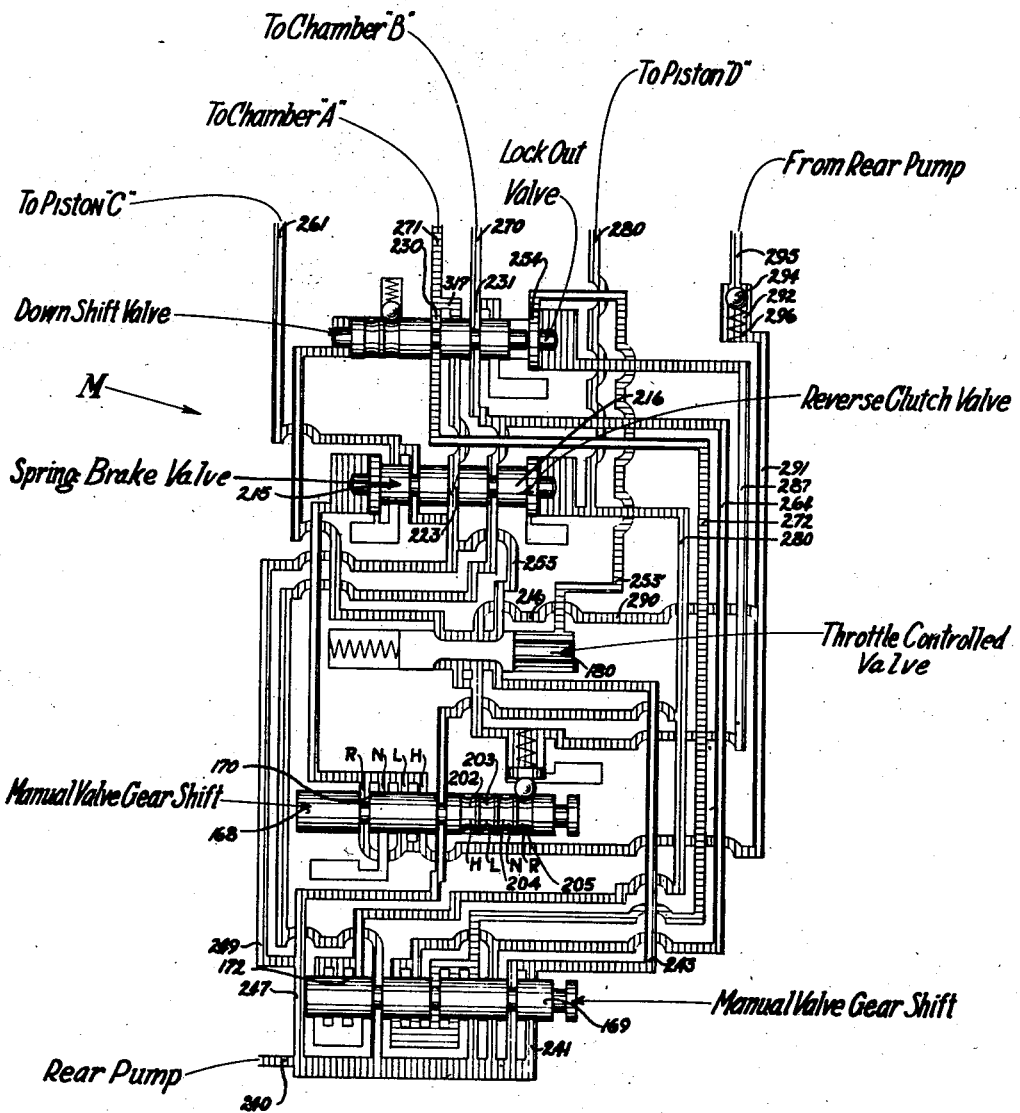
Figure 33:
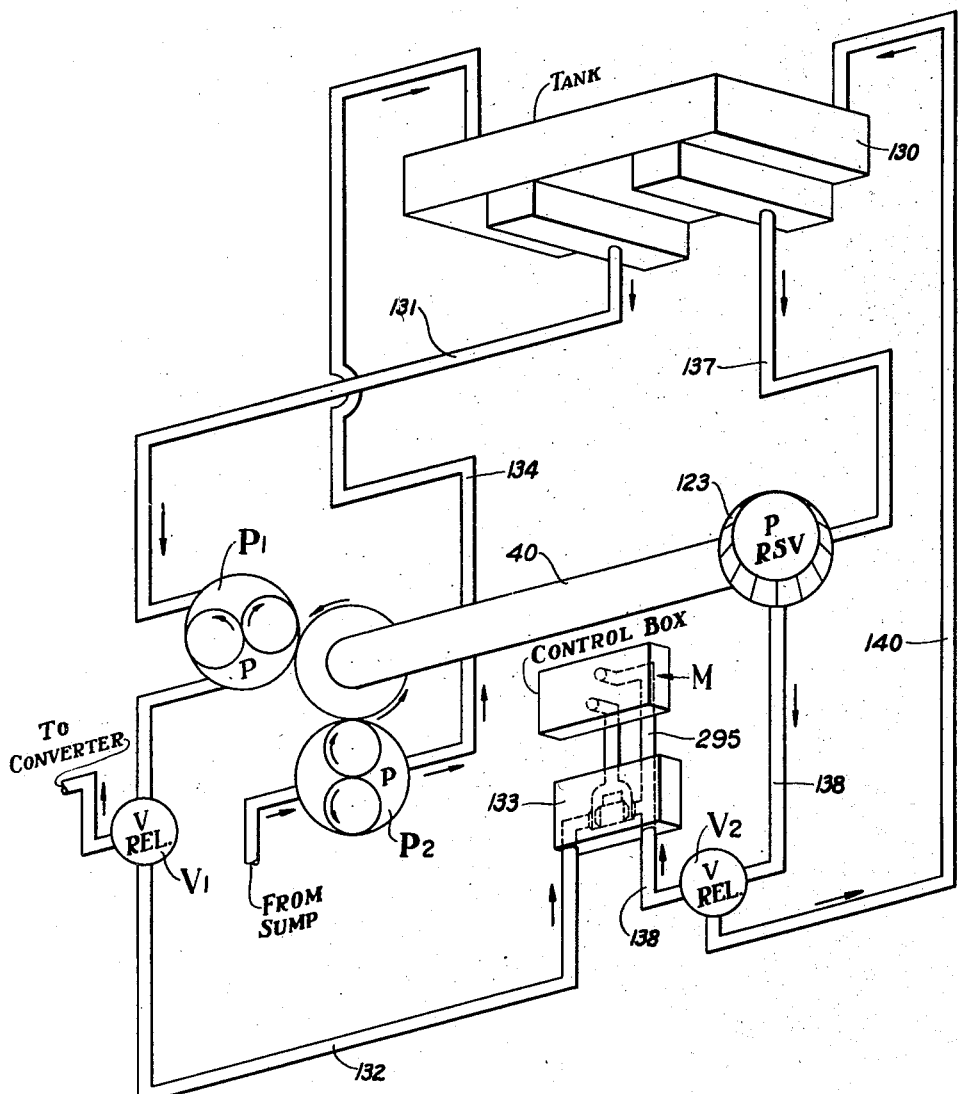

Figures 19 through 32 are diagrammatic views illustrating the several fluid passageways of the control valve means of Figures 10 through 17, and showing in elevation the several valve members of the control valve means in the positions they occupy for establishing communication between certain of the passageways for effecting operation of the transmission of Figure 3 when embodied in the arrangement of parts of Figure 1 in an automobile, with the fluid in the passageways under pressure being indicated by the vertical line shading, the fluid in the passageways under bleed being indicated by the horizontal line shading and the passageways under either pressure or bleed being without shading; throughout these several figures, and in which the most frequently encountered condition in the operation of an automobile are illustrated in these several figures, as follows:

Figure 19—engine running — transmission in neutral—throttle closed—automobile standing still;

Figure 20—engine running—transmission in neutral—throttle open — automobile standing still;

Figure 21—engine dead or running—transmission in neutral—throttle closed—automobile coasting or being pushed;

Figure 22—engine dead or running—transmission in neutral—throttle open — automobile coasting or being pushed;

Figure 23—engine running—transmission in low—throttle closed—automobile standing still;

Figure 24—engine dead or running—transmission in low—throttle open—automobile moving or being pushed;

Figure 25—engine dead or running—transmission in low—throttle closed—automobile moving or being pushed;

Figure 26—engine running — transmission in high—throttle closed—automobile standing still;

Figure 27—engine dead or running—transmission in high—throttle closed—automobile coasting or being pushed;

Figure 28—engine dead or running—transmission in high—throttle open—automobile coasting or being pushed;

Figure 29 — engine running — transmission shifted from high to low—throttle open—automobile moving;

Figure 30—engine running—transmission in reverse—throttle closed—automobile standing still;

Figure 31 — engine running — transmission in reverse—throttle open—automobile moving in reverse;

Figure 32—engine dead—transmission in reverse—throttle open—automobile being pushed forward; and Figure 33 is a diagrammatic view showing the manner in which the control valve means has connection with a fluid reservoir and pump means for supplying fluid under pressure to the control valve for effecting operation of the transmission herein disclosed.

Referring now to Figures 1 and 2, there is shown a general arrangement of parts providing a power plant for a car or automobile comprising a standard steering column 1 having a steering wheel 2 at the upper end thereof with the lower end of the steering column 1 having connection in a known manner with the front wheels of the car or automobile for steering the same. A gear shift rod 3 extending lengthwise along the steering column 1 has a lever 4 secured to its upper end below the steering wheel 2 with the outer end of lever 4 projecting beyond the steering wheel in a position to be manipulated by the driver of the car or automobile for the selective actuation of a transmission to be described hereinafter. A panel member 6 is secured adjacent the upper end of the steering post 1 in a position to be visible through the steering wheel 2, and which panel member, on its upper face, as shown in Figure 2, bears the letters R N L H, reading from left to right. An arm 7 of lever 4 has its outer end extending upwardly beyond the outer edge of the panel 6 and upon manipulation of the lever 4 may be brought into alignment with the letters on panel 6 which manipulation effects actuation of the transmission corresponding to the letter with which the arm 7 is aligned. It will be understood that the letter R indicates reverse, the letter H—High, the letter L—Low, and the letter N—Neutral, with the high and low of course meaning two selective forward gear ratios of the transmission shown for purposes of describing my present invention.

The shift rod 3 adjacent its lower end is journaled in a bracket 10 fixed to the steering column 1 and at its lower end is connected to a crank arm 11, the other end of which has connection with one end of a rod 13 through a ball and socket means 12. The other end of rod 13 is pivotally connected to one arm of a bell crank lever 14, and a rod 15 extends from the other arm of the bell crank 14 to a shift lever 16 which has connection with a lever associated with the central valve means M of my invention for the transmission 17 to be further described hereinafter. The transmission 17 hereinafter disclosed forms no part of my present invention and reference may be had to the said copending application of Harold E. Churchill, Paul V. Haigh and Harold O. Zander, Serial No. 644,828, filed February 1, 1946, in which this transmission is disclosed and claimed.

A throttle or accelerator pedal 18 has connection by means of a rod 19 with one arm of a bell crank 20, with the other arm of the bell crank 20 being connected by a rod 21 to a throttle lever 22, the function of which is described in greater detail hereinafter. The bell crank 20 is fixed to a shaft 24 which carries a second lever arm 25 having pivotal connection with one end of a rod 26 the other end of which is pivotally connected to one arm of a bell crank 27. The other arm of the bell crank 27 is pivotally connected to one end of a rod 28 the other end of which through ball and socket means is connected to the throttle valve means of a carburetor 29 for controlling the speed of the internal combustion engine partially shown in broken lines at 30.

A fluid torque converting unit of known construction, such as a torque converter 31, comprising an impeller or driving member 32, a rotor or driven member 33 and a stator or reaction member 34 is mounted rearwardly of the internal combustion engine 30 in a known manner with the impeller 32 of the torque converter having connection with the crankshaft of the internal combustion engine. The driven member or rotor 33 of the torque converter 31, is connected to the drive shaft 40 of the transmission 17 shown in detail in Figure 3, to which reference may now be had.

As previously mentioned the transmission 17 represents one suitable form of transmission with which the control means of my invention has application to provide two forward gear ratios and one reverse gear ratio and, in the embodiment shown, comprises a first housing section 42 enclosing a first or forward drive planetary gear mechanism F, an intermediate housing section 43 suitable bolted to the housing section 42 and enclosing a reverse planetary gear mechanism R, and a tail shaft housing section 44 secured, as by a plurality of bolts, to the rearward end of the intermediate housing section 43. As shown, the rearward end of the drive shaft 40 extends through an opening formed in an end wall closure plate 46 of the forward end of the transmission housing section 42, and is journaled for rotation in the end wall in a ball-bearing assembly 47. The rearward end of the drive shaft 40 is provided with a radially outwardly extending flange 49 to which a ring gear member 50 of the planetary gear mechanism F is suitably bolted. An intermediate driven shaft 52 is provided at its opposite ends with reduced forward and rearward cylindrical portions 53 and 54 which are journaled respectively, in a bore 55 in the drive shaft 40 and in a bearing sleeve supported in a bore 56 in the forward end of a tail shaft 59, which tail shaft constitutes the final driven shaft of the transmission and which is adapted to have connection with the propeller shaft (not shown) of an automobile. The planetary gear mechanism F comprises a planet carrier means 60 having splined connection with the intermediate driven shaft 52 adjacent the forward end thereof, and which planet carrier means 60 is provided with a plurality of horizontally extending studs 61, only one of which is shown, for rotatably supporting a plurality of planet pinions 62 (only one being shown) having meshing engagement with the internal teeth of the ring gear 63 of the ring gear member 50. A hollow sun gear shaft 65 extends coaxially of the intermediate driven shaft 52, and at its forward end is formed with an integral sun gear 66 having meshing engagement with the planet pinions 62 to complete the planetary gear mechanism shown at F.

The planet carrier means 60, at its rearward end, is formed with a radial flange 68 which provides for the support of a first torque transmitting means 69 for movement axially of the transmission, as by means of the splined connection between the inwardly extending annular flange 70 of the torque transmitting member 69 with the flange 68 of the planet member 60. The torque transmitting member 69 carries internal and external friction cone clutch elements 72 and 73, respectively, which are adapted to have engagement selectively with the external cone clutch surface 74 of the ring gear member 50, and the internal cone clutch surface 76 of a second torque transmitting member 77, respectively. The outer surface of the second torque transmitting member 77 is provided with a cone brake element 78 of friction material for engagement with the conical brake surface 79 of the housing section 42. The second torque transmitting member 77 is of cup-shape, and the radially extending annular flange 80 thereof has splined connection with one end of a collar 81 having splined connection with an intermediate portion of the sun gear shaft 65 for movement axially thereon. The rearward end of the housing section 42 is provided with a radially inwardly extending annular flange 85 forming a rear end wall therefor which, together with the intermediate housing section 43 and a collar member 88 extending coaxially of and spaced from sun gear shaft 65 and which sleeve member 88 at its rearward end is formed with an enlarged radially extending annular flange 87 extending transversely of housing section 43 substantially centrally thereof, form an axially extending annular cylinder 90 in which a piston 91 is adapted to be reciprocated. The piston 91 comprises a forwardly extending sleeve portion 92 and between the forward end of which and the collar member 81 a ball-bearing assembly 93 is arranged to provide for rotation of the second torque transmitting member 77 with the sun gear shaft 65. It will be observed that the cylinder 90 comprises, a pair of pressure chambers A and B one at either side of piston 91 in which, as viewed in the drawing, admission of fluid under pressure into chamber A is effective to cause movement of the piston 91 to the right, and which, by the connection thereof with the sleeve member 81 splined to the sun gear shaft 65 effects movement of the second torque transmitting member 77 to the right to engage the cone brake surface 78 thereof with the brake surface 79 of the housing section 42 to hold the sun gear shaft 65 and the sun gear 66 thereof against rotation. In this position of the parts the planet carrier means 60 is caused to be driven by the drive shaft 40 through the ring gear 63 to drive the planet pinions 62 and the planet pinion carrier means 60 which is splined to the intermediate driven shaft 52 to effect ratio or low drive between the drive shaft 40 and the intermediate driven shaft 52. Upon admission of fluid under pressure into the chamber B, the piston 91 as viewed in the drawing, is shifted to the left together with the second torque transmitting member 77 to engage the internal conical surface thereof with the external cone clutch surface 73 of the first torque transmitting member 70, which causes axial movement of the first torque transmitting member to the left, as viewed in Figure 3, to engage the internal cone clutch surface 72 thereof with the clutch surface 74 of the ring gear member 50, which thereby locks the sun gear 66 to the ring gear member 50 to provide for direct or high drive from the drive shaft 40 to the intermediate driven shaft 52. It will be observed that the area of piston 91 against which pressure in chamber B is adapted to act is of greater cross-sectional area than the area of the piston 91 against which pressure in chamber A is adapted to act. This arrangement of the effective areas of the piston for the two chambers A and B is for the purpose of providing greater clutching force when the pair of torque transmitting members are clutched to effect direct or high drive through the transmission and with lesser clutching force when the torque transmitting member 77 is locked to the case for ratio or low drive from a source of fluid under pressure for effecting the selective admission of such fluid to either of the chambers A and B. It will be observed from the above that the first and second torque transmitting members provide a combination brake and clutch means for effecting either direct or ratio drive through the planetary gear mechanism F.

A coil spring brake 95 of the known L. G. S. type extends coaxially of the sun gear shaft 65 and at its forward end is secured to a ring member 96 having splined connection with the sun gear shaft 65. It will be seen that the coil spring brake 95 lies between the sun gear shaft 65 and the axially extending sleeve 94 of collar member 88 in which the inner cylindrical surface of the collar 88 serves as a brake surface for the coil spring. A piston and cylinder means shown at C is arranged in an enlarged boss portion 97 of the flange 87 of the collar member 88. Upon admission of fluid under pressure through the port 98 formed in the housing 43 into the cylinder in boss 97, the piston 96' is moved radially inwardly against the force of the coil spring 99 disposed between the enlarged outer end piston 96' and the base of the bore forming the cylinder in the boss 97 to engage the inwardly extending reduced rod-like extension of piston 96' with the free end of a ring fixed to the free end of the coil spring 95 to condition the latter for actuation. Thus when piston 96' is caused to be moved radially inwardly, as by admission of fluid under pressure through the port 98, the coil spring brake 95 becomes an overrunning brake and its function is to take the reaction of the sun gear 65 during the transition of shifting of the torque transmitting member 77 and the intermediate torque transmitting member 69 when these latter members are shifted to effect a transition of ratio drive to direct drive or vice versa between the drive shaft 40 and the intermediate driven shaft 52. Thus when the piston 96' is energized a shift in gear ratio between the drive shaft 40 and the intermediate driven shaft 52 may be made without breaking the drive line. The function of the coil spring brake 95 is overlapping and requires no timing with any shift taking place.

The rearward end of the intermediate driven shaft 52 adjacent the reduced cylindrical portion 54 is formed with a sun gear 100 which has meshing engagement with the planet pinions 101 (only one being shown) carried by the planet carrier member 102 and which planet pinions 101 having meshing engagement with the teeth of an internal ring gear 103 formed integral with the tail or final driven shaft 59. The planet carrier member 102 is formed with an annular flange 104 extending forwardly of the transmission which is provided with internal clutch teeth having sliding engagement with the external teeth of a jaw clutch sleeve 105 which is mounted for movement axially of the intermediate driven shaft 52 with a piston shown at D by a snap ring 106. The sleeve 105, at its rearward end, is provided with internal clutch teeth adapted to have engagement in the position shown in Figure 3 of the drawings with the teeth of the sun gear 101. It will be observed with the parts in the position shown in Figure 3 that the sun gear is locked to the planet carrier 101 through the sleeve 105 to provide a direct driving connection between the intermediate driven shaft 52 and the tail or final driven shaft 59. The piston D is mounted for axial movement in a cylinder forming member 107 having a radially outwardly extending flange 109 which is suitably secured in the housing 43 between an internal shoulder thereof and the flange 87 of the sleeve member 88. The cylinder forming member 107 is provided with a suitable groove which together with a portion of the flange 87 forms a duct 110 having communication with the port 111 in the wall of housing section 43 for admitting fluid under pressure for shifting the piston D. A pin 112 is fitted in the forward end of the piston D for movement therewith, and a spring 113, disposed about the pin 112, seats against the forward end of piston D with its opposite end seating in a recess formed in the enlarged radial flange 87 of the sleeve member 88. Upon admission of fluid under pressure through the port 111 into the duct 110, the piston D is caused to be moved axially to the left as viewed in Figure 3, which movement of the piston carries with it the sleeve member 105 to disengage the internal clutch teeth thereof with the teeth of the sun gear 100. This movement of the piston D breaks the drive line between the intermediate driven shaft 52 and the final driven or tail shaft 59. Further continued shifting movement of the piston D to the left effects engagement of the external teeth thereof with the internal brake teeth 116 formed at the rearward end of the sleeve 88 to hold the sleeve against rotation. The member 105 is of suitable length to maintain engagement with the internal teeth of the annular sleeve of the planet carrier 102, so that upon movement of the piston D to the position last referred to, the planet carrier 102 is held against rotation, whereby the planetary unit R is effective to establish rotation of the final driven or tail shaft 59 in a direction opposite the direction of rotation of the intermediate driven shaft 52 to provide a reverse for the transmission. The proportioning of the parts is such that, movement of the sleeve 105 to the left by movement of piston D, is effective to first release the lock up between the sun gear 100 and the planet carrier 102 before the external teeth of sleeve 105 engage the internal teeth 116 at the rearward end of sleeve 88 to effect lock up of the planet carrier 102 with the housing section 43 of the transmission to drive the final driven or tail shaft 59 in reverse.

The rearward end of the housing section 43 is provided with an end wall 120 through which the final driven shaft 59 extends and which, together with an end wall 121 of the tail shaft housing section 44, provides a pump chamber 122 for a rotor pump shown at 123. The rotor pump 123 is of known construction and is adapted to be driven upon rotation of the tail shaft or final driven shaft 59 in the forward direction to deliver fluid under pressure for effecting actuation of the transmission in the manner to be described below. Also a conventional speedometer gear arrangement 126 is associated with the tail or final driven shaft 59. A ball bearing assembly 127 supported within the tail shaft housing section 44, provides for rotatably supporting the final driven or tail shaft 59.

The operation of the transmission is as follows:

Upon admission of fluid under pressure to chamber A with the chamber B being exhausted, the piston 92 will be moved to the right as viewed in Figure 3 to lock the torque transmitting member 77 to the case 42 which is effective to hold the sun gear 66 of the planetary unit F against rotation to provide ratio or low drive between the drive shaft 40 and the intermediate driven shaft 52. Under these conditions the ring gear is the driver and receives its driving torque from the rotor or pump member 33 of the torque converter 31 positioned ahead of it. When the chamber B has fluid under pressure admitted thereto, with the chamber A being exhaused, the torque transmitting members 77 and 69 frictionally lock the ring gear of planetary unit F with the sun gear 66, causing the planetary unit F to revolve as a unit with no reduction therethrough providing a direct or high ratio drive. When the piston 96' is caused to be moved radially inwardly, as by admission of fluid under pressure through the duct 98 into the cylinder for the piston 96' the collar of the free end of the coil spring 95 is engaged so that the coil spring 95 is conditioned to act as an overrunning brake or what is sometimes referred to as a one-way brake.

Its prime function is to take the reaction of the sun gear 66 during the transition of shifting from direct or high to ratio or low, or from ratio or low to direct or high, through the planetary gear mechanism F. The coil spring brake 95 thus allows the shift to take place without breaking the drive line between the drive shaft 40 and the intermediate driven shaft 52, and since the function of the coil spring 95 is overlapping it requires no timing with any shift from direct or high to ratio or low, or ratio or low to direct or high, in the planetary gear unit F. Neutral for the transmission is obtained by bleeding the cylinder in which the piston 96' is disposed, which then allows the coil spring brake 95 to rotate freely in either direction which, together with the bleeding of both chambers A and B, permits the torque transmitting members 77 and 69 to float. This permits the sun gear 66 to rotate in either direction, causing a break in the drive line between the drive shaft 40 and the intermediate driven shaft 52, and thus providing a neutral for the transmission. The functioning of the control means M to effect the above is described below.

Also as previously related, the piston D provides for effecting reverse drive through the transmission, and when the cylinder in which the piston operates is devoid of pressure the spring 113, surrounding the pin 112, secured in the forward end of the piston, locks the sun gear 100 with the planet carrier 102 to establish a direct drive connection in the forward direction between the intermediate driven shaft 52 and the tail or final driven shaft 59. Upon admission of fluid under pressure into the cylinder in which the piston D operates, the sleeve member 105, which forms one element of a jaw clutch, is first disengaged from the sun gear 100 and then subsequently is effective to lock the planet carrier 102 to housing section 43 through the collar member 88 to establish reverse driving connection between the intermediate driven shaft 52 and the tail or final driven shaft 59.

Referring to Figures 1 and 33 it will be seen that a reservoir 130 containing oil for effecting operation of the control valve means M is disposed above the transmission 17. A conduit 131 extends from the reservoir 130 to a pump means $P_1$ disposed within the torque converted case for delivering fluid under pressure through a conduit 132 to a shuttle valve housing 133, shown in detail in Figure 18 associated with the valve means M. The housing section 42 and 43, as shown in Figure 3, are provided with sump or oil collecting portions 135 and 136 respectively, with the oil or fluid collected in the sump portions 135 and 136 being adapted to be returned to the reservoir 130 through the conduit 134 by the pump means $P_2$ within the torque converter case. The incorporation of such pump means with a torque converter per se form no part of my present invention and hence are only diagrammatically illustrated in Figure 33. As shown the pumps $P_1$ and $P_2$ are caused to be driven by the shaft 40. A relief valve $V_1$ is interposed in the conduit or line 132 to provide oil under pressure of the order of 40 lbs. per sq. in. to the torque converter. It will also be observed that a conduit 137 extends from the reservoir, and this conduit is adapted to deliver oil from the reservoir 130 to the pump chamber 122 of the housing 43. The fluid delivered under pressure from the chamber 122 by the rotor pump, shown at 123 is adapted to be delivered to a fluid passageway 138 shown in Figures 18 and 33. A relief valve V₂ is associated with the rotor pump 123 in passageway 138 so that under certain conditions of operation the fluid under pressure developed by the pump 123 is adapted to be returned to the reservoir 130 through a conduit 140.

Referring now particularly to Figure 18 it will be observed that the conduit 132 is adapted to deliver fluid under pressure to a tapped port 141 formed in one end of the valve housing 133 with which the connection fixed to the discharge end of the conduit 132 has threaded engagement. Also, fluid under pressure is adapted to be delivered to the conduit or passage at 138 at the other end of the housing 133 of the valve means 150. The fluid passageway 138 has communication with a bore 146 which opens into an enlarged valve receiving cylindrical chamber 147 and which chamber at its opposite end has a sleeve 149 fixed adjacent the tapped opening 141. A cylindrical valve member 150 is slidingly disposed within the valve receiving chamber 147 and is provided with tapered valve portions 151 and 152 at its opposite ends. A pair of ports 153 and 154 establish communication adjacent opposite ends of the valve chamber 147 with a passageway 155 of a wall member 156 of the transmission housing for the fluid control valve means M. In the arrangement above delivery of fluid under pressure through the tapped opening 141 from the conduit 132 shifts the cylindrical valve 150 to the right, as viewed in the drawing, to seat the valve portion 152 thereof on the valve seat formed at the intersection of the bore 146 with the valve chamber or bore 147 which provides for admission of the fluid under pressure thru the port 153 into the chamber 155. Assuming that the torque converter is not in operation but the car with which the transmission is assembled is being pushed forward so that the rotor pump 123 is being operated, it will be seen that fluid under pressure will be delivered to the passageway 138 and will enter the bore or valve chamber 147 causing the cylindrical valve 150 to shift to the left, as viewed in the drawing, to seat the valve portion 151 thereof upon the seat formed at the inner end of sleeve 149 fixed in the end of the bore 147 adjacent the tapped opening 141, and effecting the delivery of fluid under pressure through the port 154 into the passageway 155. If the fluid pressure is being delivered to the valve housing means 133 through both the conduit 132 and through the passageway 138 the valve will assume the intermediate position shown in the drawing, providing of course the pressure of the fluid being delivered from opposite ends of the valve are of substantial equal pressure which effects delivery of fluid under pressure from both sources through the ports 153 and 154 to the chamber 155. The arrangement of the valve means 150 is such that with the internal combustion engine running the pump means P₁ driven by the torque converter is delivering fluid under pressure to the hydraulic control means M, or if the motor is dead and the car is being pushed fluid under pressure will be delivered to the passageway 138 to the control means M.

The control means M of my invention has been designed to function on pressures of the order of 80 lbs. per square inch and the pump means P₁ and the rotor pump 123 when driven are capable individually of delivering fluid under pressure of the order noted. As previously related the relief valve V₁ provides for delivering fluid under pressure from the supply conduit 132 to the torque converter of the order of 40 lbs. per square inch and with the fluid passing through the conduit 132 being adapted to be delivered to the valve means 150. The aforedescribed valve means 150 is adapted to effect the delivery of fluid under pressure from the pump means P₁ and the rotor pump 123 through the conduits 132 and the passageway 138, respectively, and in the event the pressure in the conduit 132 is less than that of the pressure in the conduit 138, the valve 150 will be shifted to the left, as viewed in Figure 18, admitting the fluid under pressure from the rotor pump 123 through the port 154 into the receiving chamber 155 of the block members 156 of the control means M. With the valve 150 shifted to the left it will be observed that the conduit is closed by seating of the tapered seat portion 151 of the valve 150 on the seat provided therefor in the sleeve member 149 so that fluid from the rotor pump is not delivered in the reverse direction through the conduit 132. Likewise, if the pressure of the fluid in the conduit 132 exceeds that of the pressure of the fluid in the conduit 140, the valve 150 will be shifted to the right seating the tapered seat portion 152 thereof on the valve seat formed at the outlet of the bore 146 whereupon fluid from the pump P₁ will be delivered to the conduit 132 into the body of the valve means 150 and into the port 153 and then into the receiving chamber 155 of the control valve means M. Under the latter conditions fluid delivered through the conduit 132 into the control valve means 150 will not be discharged into the bore 146 and into the conduit 138 leading from the rotor pump 123. If the fluid being delivered from both the pump P₁ and the rotor pump 123 are of substantially equal pressures, the position of the control valve member 150 will remain unchanged after having been positioned by whichever pump that had first delivered fluid pressure to control valve member 150. Upon reference to Figure 33 it will be observed that the passageway 138 has a branch or extension passageway 295 so that fluid under pressure being delivered by the rotor pump will be conducted by the passageway 295 directly to the control valve means M the purpose of which as will appear in detail hereinafter functions as a governor means to condition the L. G. S. brake for operation to prevent breaking of the driving connection between the drive and intermediate driven shafts of the transmission in effecting a shift from low to high or vice versa. Further it will be observed that if the engine is dead but the car is being pushed forwardly fluid under pressure developed by the rotor pump 123 will be delivered to the valve means 150 and directly to the control valve means M through passageway 295 by reason of which the engine of the vehicle may be started by pushing the vehicle in a forward direction. If the engine is running and fluid under pressure is being delivered by pump P₁ to effect movement of the valve 150 to the right, as viewed in Figure 18 and seating the valve portion 152 of the valve 150 to close port 146, it will be observed that under these conditions with the car moving forwardly that fluid under pressure delivered by the rotor pump 123 will be delivered through passageway 295 to control valve means M. Under the latter circumstances excessive fluid under pressure will be relieved by the pressure relief valve V₂ through the conduit 140 and back to the reservoir 130. The purpose of this arrangement will be referred to in detail hereinafter.

From the above description of the valve 150 it will be observed that with the engine idling, fluid under pressure is being delivered by means of the pump P₁ to the control valve means M and with the vehicle in motion and motor running fluid under pressure is adapted to be delivered by both the pump P₁ and the rotor pump 123. It will thus be observed that under the conditions of the vehicle standing still with the motor running a source of fluid under pressure will be available for the actuation of the control means M, or with the engine dead but the vehicle in motion fluid under pressure will be caused to be delivered to the control valve means M by means of the rotor pump 123 as above described.

Reference may now be had to Figures 10 through 17 which illustrate in structural detail the control valve means M of my present invention. In Figure 13 it will be observed that the shift lever 16 has connection with a hollow cylindrical stud 160 journaled in a bearing boss 161 formed integrally of a cover member 163 of the control valve means M. The stud 160 has a lever 164 secured thereto and which lever 164 is provided with a U-shaped end portion 165 in which a pin 166 is pivotally mounted. A plate member 167 is secured to the inner end of the pin 166 and the plate member has connection with a pair of cylindrical manual valve members 168 and 169 by fitting in annular grooves formed in the adjacent ends of the valve members 168 and 169. The valve members 168 and 169 are adapted to be reciprocated axially in the cylindrical bores 170 and 172, respectively, of a valve body member 175 shown in detail in Figure 14. The positions of the pair of manual valve members 168 and 169 may be dictated by the operator of the vehicle by manipulation of the selector lever 4 adjacent the steering wheel by means of the connection thereof with lever 16 as previously described.

The lever 22, as shown in Figure 13, has connection with a stud 177 which extends through the hollow stud 160 and is mounted for relative rotation therein with the other end of the stud 177 having a throttle controlled lever 178 connected thereto and which throttle controlled lever 178 at its opposite end is adapted to abut one end of a cylindrical throttle controlled valve member 180 mounted for reciprocal movement in a bore 182 (see Figures 14, 15, 16 and 17) extending parallel with the bores 170 and 172 in the valve body member 175. The throttle controlled valve member 180 is adapted to be reciprocated in the valve body member 175 by manipulation of the throttle pedal 18 through the connection thereof with lever 22 by the operator of the vehicle as previously related.

It will be observed that control valve means M of my invention, in addition to the cover member 163 and the valve body member 175 previously described, comprises a portion of a wall 156 of the housing section 43 of the transmission case (see Figure 14), a first transfer plate 184 and a second transfer plate 185. The portion 156 of the wall of the transmission case, the transfer plate 184, the valve body 175, the transfer plate 185, and the cover member 163 are provided with suitable passageways, conduits and the like, to be described in connection with the diagrammatic showing of such passageways and conduits in connection with Figures 19 through 32. For purposes of simplicity of describing my present invention I shall not attempt to describe the intricacies of the several passageways as shown in Figure 14 except where such passageways are clearly observable in conjunction with the description of the diagrammatic drawings of Figures 19 through 32. However, it will be observed that the several elements of the control valve means M are assembled in rigid relation with the transfer plate 185 between the cover member 163 and the valve body member, and the transfer plate 184 between the valve body member 175 and the wall portion 156 of the transmission case. Also, as shown in Figures 15, 16 and 17, it will be observed that an enclosing housing or cover member 188 encloses the several assembled parts, which cover member is adapted to be secured by a plurality of bolts 189 to the side wall 156 of the transmission housing. The cover member 188 provides for the collection of fluid under bleed from certain of the passageways and for the return of such fluid through the passageway 192, shown in Figures 14 and 17, to the sump collecting portions 135 and 136 of the transmission. Also, as shown in Figure 16 the fluid receiving chamber 155 of the control valve means M effects delivery of fluid under pressure through the passageway 193 to the transverse passageway 194 to the opening 196 in the transfer plate 184. The valve body 175 also comprises a second pair of cylindrical bores 197 and 198 extending parallel with the cylindrical bores 170, 172 and 182 for the reception of certain other valve members to be described in connection with Figures 19 through 32.

In the following description of the control means M of my invention in connection with Figures 19 through 32, the passageways, ports, valves and the like there identified by reference numeral are also indicated on Figures 14 through 17 where they clearly appear on the latter figures.

*Transmission in neutral—engine running—car standing still—throttle closed as illustrated in Figure 19*

Referring now more particularly to Figure 19, it will be observed that the manual control valve 168 is provided with an annular groove 200 adjacent one end thereof opposite the end having connection with lever 164, an annular groove 201 substantially intermediate the ends thereof, and with a plurality of detent grooves 202, 203, 204 and 205 with a ball detent 206 normally urged by the coil spring 207 acting upon the disc 208 between the ball 206 and spring 207 for normally maintaining the ball 206 seated in one of the aforesaid grooves. The valve member 168 is positionable by manipulation of the selector lever 4 adjacent the steering wheel for selectively positioning the valve member with the grooves 202, 203, 204 and 205 thereof in position to be engaged by the ball 206 and in which the grooves 202 through 204 correspond respectively with the positions of the pointer 7 with respect to the indicia on the panel 6 in the following order H or high, L or low, N or neutral, and R or reverse.

The cylindrical valve member 169 is formed with three annular grooves 210, 211 and 212 for connecting certain passageways of the control valve means M to be hereinafter described and it is movable axially together with valve member 168 by means already described.

The throttle controlled valve 180 as shown more clearly in Figures 15 and 16 is provided with a pair of opposed slots 213 and 214 extending lengthwise of the valve member 180 for connecting certain fluid passageways of the control valve means M as hereinafter related. The bore 197 of the valve body 175, as shown in Figures 15 and 19, receives a cylindrical spring brake valve 215, and a reverse clutch valve 216 for axial shifting movement therein. The spring brake valve 215 is provided with an annular groove 217, and at its outer end is formed with an enlarged end disk portion 218 fitting within an enlarged end portion of the bore 197. The reverse clutch valve 216 is provided with an annular groove 220, and at its outer end is provided with an enlarged disk member 221 fitting in the other enlarged end portion of bore 197 against which fluid under pressure is adapted to act to effect shifting thereof. A coil spring 223 is interposed between the adjacent inner ends of the spring brake valve 215 and reverse clutch valve 216 for normally maintaining the valve members in the positions thereof shown in Figures 15 and 19.

The bore 198 of the valve body receives a downshift valve 225 which adjacent its outer end is provided with a pair of grooves 226 and 227 with which a spring loaded ball detent 229 is adapted to be engaged for yieldingly maintaining the downshift valve in a predetermined position. The downshift valve 225 is further provided with a first annular groove 230 and a second annular groove 231 for effecting the connection of certain fluid passageways of the control valve means M. The bore 198 is also provided with an enlarged portion for the reception therein of a lock-out valve 235 the function and purpose of which will become apparent as the description proceeds.

The operation of the control means M together with the several positions of the aforementioned valve members with respect to the fluid passageways of the control means will now be described under the different selected conditions of operation of a vehicle.

Under the above conditions fluid under pressure is delivered from the torque converter pump $P_1$ through the valve means 150 to the passageway 240 of the control valve means M. The fluid passageway 240 has a branch 241 which is adapted to be connected by means of the annular groove 212 of the manual valve 169 with the branch 242 of a fluid passageway 243 leading to the bore 182 in which the throttle controlled valve 180 is movable axially. In the closed position of the throttle controlled valve 180 the lengthwise extending slot 213 thereof has connection with the branch 245 of the fluid passageway 243. The fluid under pressure in the passageway 243 is ineffective under these conditions. It will be observed that a passageway 247 having connection with the main inlet passageway 240 extends to the bore 170 in which the manual valve 168 is mounted for axial movement and that the latter valve is in a position preventing flow of fluid under pressure through the passageway 247. A branch passageway 249 has connection with the passageway 247 and leads to the bore 197 in which the reverse brake valve 215 and the spring clutch valve 216 are mounted at the portion thereof forming a pressure chamber 250 between the inner ends of the valves referred to. A passageway 251 extends from the pressure chamber portion 250 of the bore 197 for the aforesaid valves, and leads to the bore 198 in which the downshift valve 225 is mounted for reciprocation. In the position of the downshift valve 225 shown in Figure 19 the passageway 251 is closed. Anterior to the fluid pressure chamber 250 of the bore 197 for the reverse clutch valve and the spring brake valve, a passageway 253 has connection with the branch 249 and through the slot 214 of the throttle controlled valve is adapted to have connection with a passageway 253' extending to a pressure chamber 254 between downshift valve 225 and lock out valve 235. Fluid under pressure delivered through passageway 253' is effective to urge the downshift valve 225' to its left hand position as shown in Figure 19.

A second branch 255 extends from the fluid passageway 249 anterior of the pressure chamber 250 to the portion of the bore 197 in which the spring brake valve 215 is mounted for reciprocation. The passageway 255 in the position of the spring brake valve 215 shown in Figure 19 is closed by the latter. The several passageways above described are all shaded with vertical line shading to indicate that these several passageways have fluid under pressure therein and which under the conditions above defined fluid under pressure is being delivered to the control valve means M at substantially 80 lbs. per square inch by the torque converter pump $P_1$. The fluid under pressure in chamber 250 delivered thereto through the main passageway 240 and branch passageway 249 acts on the inner ends of the spring brake valve 215 and reverse clutch valve 216 to position the former in the position shown in Figure 19 in which the annular groove 217 thereof establishes connection between a bleed outlet 259 off of the bore 197 and the branch 260 of a passageway 261 leading to the piston and cylinder means C which as previously mentioned provides for the selective conditioning of the L. G. S. coil spring brake 95. Under these conditions of bleed through 259 the piston 96' of the piston and cylinder means C is in its retracted position so that the coil spring brake 95 is not conditioned for operation. The pressure in the chamber 250 as above noted also effects shifting of the reverse clutch valve 216 to the right, as shown in this figure, with the annular groove 220 thereof out of registration with the branch 263 of a fluid passageway 264 and a fluid passageway 265, the function of which will be hereinafter described. It will be observed that the fluid passageway 264 extends from the bore 198 for the downshift valve 225 through a first branch 266 to the bore 172 for the manual valve 169 and through a second branch 267 to the latter bore. In the position of manual valve 169 in the figure the second branch 267 is connected by the annular groove 210 in the manual valve 169 with one branch of a relief or bleed chamber 268 extending off of the bore for the manual valve 169. Also in the position of downshift valve 225 in the figure the annular groove 231 thereof is aligned with the end of passageway 264 opening into bore 198 and with the passageway 270 leading to chamber B of the transmission. Thus, the chamber B is under bleed. In effecting bleeding of chamber B it will be observed that fluid under pressure in chamber 254 between downshift valve 225 and lock-out valve 235 is effective to urge the downshift valve 225 to a position in which the ball detent 229 is engaged in the groove 226 aligning the annular groove 231 thereof with the passageway 270 leading to the pressure chamber B and passageway 264. Also, in this position of the downshift valve 225 the annular groove 230 thereof is in alignment with a fluid passageway 271 extending to the chamber A of the transmission of Figure 3 and a fluid passageway 272 having a branch 273 with which the annular groove 211 of the manual valve 169 is in alignment together with a branch 274 of the bleed chamber 268. It will thus be observed that since chamber A, as well as the chamber B, previously described, are both under bleed and the piston and cylinder means C is deenergized that the transmission, Figure 3, is in neutral. A fluid passageway 280 extends from the cylinder in which the piston D of Figure 3 is mounted for reciprocation for effecting reverse braking action of the planetary gear mechanism R and which fluid passageway 280 opens into the bleed outlet 282 associated with the bore 172 for the manual valve 169. It will be observed that the fluid passageway 280 is provided with a branch portion 283 leading to a pressure chamber 284 formed by the enlarged end of bore 197 at the outer end of the reverse clutch valve 216. The spring 223 disposed between the inner ends of the spring brake valve 215 and the reverse clutch valve 216 is a very light spring and is used merely as a separating means to allow fluid under pressure into chamber 250. It will be observed that by virtue of the positioning of the manual valves 169 and 168 in the positions shown in this figure that fluid under pressure is directed through the lengthwise slot 214 of the throttle controlled valve 180 when the throttle controlled valve is in its closed position as shown, so that oil under pressure is directed to act on the end of the down shift valve 225 within the pressure chamber 254 to position the downshift valve 225 in the position shown in this figure with the detent ball 229 engaged in the groove 226, which as will hereinafter appear is the position the downshift valve occupies when the transmission is to be actuated for low or ratio drive. Also, the pressure acting in the pressure chamber 254 effects shifting in the lock-out valve 235 to the right to its inoperative position. Also it will be observed that lengthwise extending slot 213 in the throttle controlled valve 180 is charged with fluid under pressure in readiness for the delivery thereof to actuate the interlock plunger 208 of the locking ball detent 206 associated with the manual valve 168. It will be further observed that with the manual valves 168 and 169 in the position shown in Figure 19 and under the conditions above assumed, that the fluid passageway 261 to the clutch and piston means C is under bleed, the passageway 271 to chamber A is under bleed, the passageway 270 to the chamber B of the transmission of Figure 3 is under bleed, and the fluid passageway 280 extending to the cylinder in which piston B is disposed is under bleed so that the driving connection between the torque converter and the propeller shaft of the vehicle is interrupted through the transmission.

*Transmission in neutral—engine running—car standing still—throttle open as shown in Figure 20*

The diagrammatic showing of the control means M of my invention under the above conditions and as shown in Figure 20 remains substantially the same as the showing thereof in Figure 19 except for the following. Under the conditions herein assumed the throttle controlled valve 180 has been urged inwardly of the bore 182 in which it is mounted for reciprocation by manipulation of the throttle pedal 18 shown in Figure 1 and through the linkage connection of the throttle pedal 18 with the throttle controlled valve 180 as previously described. When this is done it will be observed that the lengthwise extending slot 213 in the valve 180 connects the branch 245 of fluid passageway 243 with the pair of branches 285 and 286 of a fluid passageway 287 in which fluid passageway 287, a fluid pressure chamber 288 is interposed. The pressure of the fluid in the chamber 288 acts against the interlock plunger or disc 208 to seat the ball detent 206 in the groove 204 of the valve 168 to prevent manually shifting of the manual valve 168 by manipulation of the gear selector lever 4 disposed below the steering wheel 2. It will be further observed that the fluid passageway 287 extends to the pressure chamber 254 at the outer end of lockout valve 235 to effect shifting of the latter to the left, as viewed in the drawing, and into engagement with the adjacent end of the downshift valve 225 to maintain this valve in the position with the ball detent 229 seated in the annular groove 226. Also upon movement of the throttle controlled valve 180 to its fully opened position that the longitudinal slot 214 thereof is effective to connect the fluid passageway 253 with a fluid passageway 290 which has connection with a fluid passageway 291. The fluid passageway 291 at one end thereof, and as shown at the upper right hand portion of the figure, is formed with a pressure chamber 292 in which a ball valve 294 is normally maintained seated on a valve seat formed between the intersection of the passageway 295 with the chamber 294. A spring 296 is provided to normally seat the ball valve 294 on its seat. Again referring to Figure 33, it will be observed that the conduit or passageway 295 is formed as a continuation of the conduit 138 through which fluid under pressure is delivered by the rotor pump 123 to the valve means 150 with the valve means 150 being formed with a by-pass connection leading to the conduit 295. The conduit 291 at its other end is provided with a plurality of branches 297, 298 and 299 which open into bore 170 of the valve body 175 the outlets of which in the position of the parts shown in Figure 20 are caused to be closed by the manual valve 168. The function of the several outlet branches 297, 298 and 299 will be described hereinafter. Further, the lengthwise extending slot 214 in the throttle controlled valve 180 in the fully open position thereof establishes connection between the fluid passageway 253 and a fluid passageway 302 which extends to a pressure chamber 303 at the end of the bore 198 for the downshift valve 225 adjacent the detent 229. However the fluid under pressure acting in the chamber 303 against the adjacent end of the downshift valve 225 is not sufficient to overcome the force of the fluid under pressure acting in chamber 254 against the lock-out valve 235 which is of substantially greater area than the area of the end of the downshift valve in which pressure in the chamber 303 is acting. The remaining conditions of the control means M in this figure are the same as that described in connection with Figure 19. It will be noted that the downshift valve 225 is maintained in its low position i. e., with the ball detent 229 in engagement with the annular groove 226 thereof and fluid under pressure in the pressure chamber 288 locks the manual valve 168 against movement by the operator of the vehicle. It will further be observed that the fluid passageways 261, 271, 270 and 280 leading respectively to the piston and cylinder means C, to chamber A, to chamber B, and to the cylinder of piston D remain in bleed. The previously mentioned spring loaded ball check valve 294 disposed within the pressure chamber 292 having connection with the conduit 291 under the conditions assumed is caused to be seated on its seat to prevent flow of fluid under pressure from the pump $P_1$ driven by the torque converter into the fluid passageway 138 to the rotor pump 123 which as previously noted is adapted to deliver fluid under pressure when the vehicle is in motion in the forward direction. However, if at any time while the vehicle is in motion and fluid under pressure is being delivered by the rotor pump 123 through the conduit 138 and into the fluid passageway 291 with this fluid pressure being in excess of the pressure of the fluid being delivered by the torque converter pump $P_1$, the pressure of the fluid in the conduit 295 will be open or unseat the check valve 294 and deliver fluid under pressure to the conduit 291.

*Transmission in neutral—engine dead or running—car coasting or being pushed—throttle closed as shown in Figure 21*

The functioning of control means M, as shown in Figure 21 is substantially the same as that shown in Figure 19 except that with the car coasting or being pushed the rear pump 123 since it is mounted on the tail shaft of the transmission delivers fluid under pressure to the conduit 295 which unseats the ball valve 294 from its seat to admit fluid under pressure to passageway 291. However the branches 297, 298 and 299 branching off of the fluid passageway 291 are all charged with fluid under pressure but are caused to be closed by the manual shift valve 168. Upon shifting of the manual valve 168 the annular groove 200 thereof is adapted to be aligned selectively with the branches 297, 298 and 299 to admit fluid under pressure to branches 306, 307 and 308, respectively, of fluid passageway 310 leading to pressure chamber 311 in which the enlarged disk 218 of the spring brake valve 215 is disposed to effect as will hereinafter appear admission of fluid under pressure to the cylinder of piston and cylinder means C to engage piston 96' with the ring member at the free end of the transmission of Figure 3 upon appropriate shifting movement of the manual valve 168 through the instrumentality of the shift lever 4 disposed below the steering wheel 2. It will be observed that the pressure chamber 288 interposed in the passageway 287 is under bleed so that the ball detent 206 is only maintained in engagement with the groove 204 of the manual shift valve 168 under the force of spring 207 so that under the conditions herein shown the manual shift valve 168 may be reciprocated in its bore 170 in the valve body 175 by the operator of the vehicle.

*Transmission in neutral—engine dead or running—car coasting or being pushed—throttle open as shown in Figure 22*

With the throttle controlled valve 180 fully opened under the same conditions as in Figure 21 except for the position of said throttle controlled valve, it will be observed that the control valve means M has its several passageways under bleed and pressure in the identical manner shown in Figure 20, except that the pressure chamber 288 now contains fluid under pressure urging the interlocked disk plunger 208 into engagement with the ball detent 206 with the groove 204 which prevents manipulation of the shift lever 4 by the operator of the vehicle under such conditions as above assumed. Further, the movement of the throttle controlled valve 180 changes the passageway 302 with fluid under pressure to maintain the downshift valve 225 in position with the ball detent 229 in engagement with groove 226 thereof.

As a general observation in connection with Figures 19 through 22, it will be observed that with the gear shift selector lever 4 in neutral position that manual movement thereof cannot be effected by the driver unless the throttle controlled valve 180 is in its closed position.

*Transmission in low — engine running — car standing still—throttle closed—as shown in Figure 23*

Before the pair of manual valves 168 and 169 can be shifted into the low position by manipulation of the lever 4, the throttle controlled valve 180 must be in its fully closed position, i. e., with accelerator pedal 18 released. Upon permitting the throttle controlled valve 180 to assume its fully closed position the pressure chamber 288 interposed in the passageway 287 is under bleed through passageway 287 and branch 285 thereof opening into bore 182 so that only the spring 207 acts against the ball 206 for seating it in any of the several grooves 202 through 205 of the manual valve 168. Upon release of the manual valve 168 as by positioning of the throttle controlled valve 180 into its fully closed position, the pair of manual valves 168 and 169 may be shifted to the right as viewed in Figure 23 to engage the low groove 203 thereof with the ball detent 206. With the throttle valve 168 in the position shown, the manual valve 169 is also shifted to the right to align the annular groove 211 thereof with the branch 315 of the fluid delivery passageway 240 and the branch 316 of fluid passageway 272 and which through the alignment of annular groove 230 of the downshift valve 225 with the passageway 272 and passageway 271 effects the delivery of fluid under pressure to the chamber A of the transmission of Figure 3. Fluid under pressure is also delivered through the branch 247, the fluid passageway 249, the passageway 253, the lengthwise extending slot 214 in the throttle controlled valve 180, and the fluid passageway 253' to the pressure chamber 254 to cause the lockout valve 235 to be shifted to the right as viewed in this figure, with the pressure in the chamber 254 acting against the adjacent end of the downshift valve 225 to maintain it in its low position with the spring loaded ball detent 229 seated in groove 226. Thus with the position of the manual valves 168 and 169 shown in this figure and under the conditions of operation above noted fluid under pressure is delivered to the chamber A which effects movement of the piston 92 to the right, as viewed in Figure 3, to cause the torque transmitting member 77 to engage the housing section 42 of the transmission case to hold the sun gear shaft 65 and the sun gear 66 thereof against rotation. As previously related this provides a low or ratio drive from the drive shaft 40 to the intermediate driven shaft 52 and which with the planetary gear mechanism R locked up provides low or ratio drive in the forward direction to the tail shaft 59 of the transmission.

*Transmission in low—engine dead or running—car moving or being pushed—throttle open as shown in Figure 24*

In this figure the throttle controlled valve 180 is shown in its fully open position which position may also be referred to as the downshift position thereof. Upon the throttle controlled valve 180 being caused to assume this position by depression of the accelerator pedal 18 by the driver of the vehicle, fluid under pressure flows from the branch 247 of the fluid passageway 240 through the passageway 249, the passageway 253, the lengthwise slot 214 in the throttle controlled valve 180 to the passageway 302 and into the chamber 303 where in acting against the adjacent end of the downshift valve 225 causes movement of the same to its high position or to the right as viewed in this figure, with the ball detent 229 engaging the groove 227. In this position of the downshift valve the annular groove 230 therein establishes communication between the fluid passageway 251 and the branch 317 of the fluid passageway 271 leading to the chamber A of the transmission of Figure 3. Also the rotor pump 123 is causing fluid to be delivered under pressure through the conduit 295 into the pressure chamber 292 unseating the ball valve 294 so that the passageway 291 is charged with fluid under pressure and which through the branch 298 thereof in alignment with the annular groove 200 of the manually shiftable valve 168 with the branch 307 of fluid passageway 310 effects delivery of fluid under pressure to the chamber 311 to act against the spring brake valve 215 to shift the same to the right, as viewed in Figure 24 of the drawing, and align the annular groove 217 thereof with the branch 255 of the fluid passageway 249 with the branch 320 of the fluid passageway 261 leading to the cylinder of the piston and cylinders means C. The fluid pressure in the conduit or passageway 261 thus causes the piston 96' to move radially inwardly and engage the ring member at the free end of the L. G. S. coil spring brake 95. The fluid under pressure delivered by the rear pump 123 through the conduit 295, the open check valve 294, the chamber 292, the passageway 291 and branch 298 thereof, the annular groove 200 of the manual valve 168, the branch 307 of passageway 310, the passageway 310, and pressure chamber 311 acts solely against the spring brake valve 215 to position it into the position shown in Figure 24. However it will be observed that fluid under pressure from the converter pump P₁ through the passageway 240, branch conduit 247, passageway 249, passageway 253, slot 214 of throttle controlled valve 180, passageway 302 to the chamber 303 effects shifting of the downshift valve 225 from low to high position. Further, it will be observed that fluid under pressure in the line 291 through the connection of the passageway 290 therewith also effects delivery of fluid under pressure through the lengthwise slot 214 in the throttle controlled valve 180 to add its pressure to that from the supply passageway 249 to the chamber 303 for effecting shifting of the down shift valve from low to high position. Also fluid under pressure is delivered by the rotor pump 123 through the conduit 295, fluid passageway 291, passageway 298, slot 214 of the throttle valve 180, fluid passageway 253, branch 255, annular groove 217 of spring clutch valve 215, and branch 320 of the passageway 261 to the cylinder of the piston and cylinder means C. When the transmission has thus been actuated by manipulation of the manual valves 168 and 169 the energization of the cylinder and piston means C serves no function except to cause engagement of the inner end of the piston 96', with the collar of the coil spring brake 95 in readiness for a shift transition to take place from low or ratio, to high or direct in which case the coil spring brake as described in connection with the physical embodiment of the transmission disclosed takes the reaction of the sun gear 66 until shifting of the pair of torque transmitting members 69 and 77 is effected to complete the shift.

*Transmission in low—engine dead or running—car coasting or being pushed—throttle closed—as shown in Figure 25*

The diagrammatic showing of the control means of this figure is substantially the same as that shown in Figure 23 except that with the car coasting or being pushed the rear pump 123 is causing fluid under pressure to be delivered through the conduit 295 opening or unseating the ball valve 294 from its seat, and charging the conduit 291 with fluid under pressure. The fluid under pressure in the conduit 291 is being delivered through the branch 298 thereof, the annular groove 200 of the manual shift valve 168, and the branch 307 of the conduit 310 to the pressure chamber 311 which effects shifting movement of the spring brake valve 215 to the right to the position the spring brake valve occupies, as described in connection with Figure 24. This movement of the spring brake valve member 215 to the right, is effective, as described in connection with Figure 24, to charge the fluid passageway 261 with fluid under pressure to condition the coil spring brake 95 in readiness for a shift transition to take place.

*Transmission in high — engine running — car standing still—throttle closed—as shown in Figure 26*

Assuming now that the driver of the vehicle actuates the shift selector lever 4 to effect movement of the manually operated valves 168 and 169 to the position thereof as shown in Figure 26 in which the ball 206 of the spring loaded detent is engaged in the groove 202 of the manual valve 168 which groove corresponds to the high speed condition of the transmission. Movement of the pair of manually operated valves 168 and 169 is conjoint so that the manual lever 169 has also moved a like amount to the right to align the annular groove 211 thereof with the high pressure branch 323 of the fluid passageway 240 with the branch 266 of fluid passageway 264 which through the reduced annular groove 231 of the downshift valve 225 has connection with the fluid passageway 270 extending to chamber B. The condition shown in Figure 26 represents the condition of starting of the vehicle in high or direct drive through the planetary gear mechanism F. It will be understood, of course, that the throttle controlled valve 180 has had to be in its closed position before the manual valves 168 and 169 could be shifted from the neutral position to the high position, as shown. Under these conditions fluid under pressure delivered by pump P₁ passes through passageway 240, branch passageway 247, passageway 249, passageway 253, lengthwise slot 214 in the throttle controlled valve 180 which in the position shown connects with the fluid passageway 253' to direct the fluid under pressure to the pressure chamber 254 urging the lockout valve 235 to the right and maintaining the down shift valve 225 in its low position with the ball detent 229 engaged in low groove 226. Under these conditions the chamber A is caused to bleed through the fluid passageway 271, annular groove 230 of downshift valve 225 fluid passageway 272 which through the branch 325 thereof is in alignment with the annular groove 210 of manual valve 169 connecting with bleed chamber 268. Charging of the chamber B of the transmission of Figure 3 with fluid under pressure causes axial movement of the torque transmitting member 77 and the torque transmitting member 69 to the left to lock the ring gear to the sun gear of the planetary gear mechanism F. Thus with the control means M actuated to connect the several fluid passageways of Figure 26 under pressure and bleed as described is effective to provide direct drive through the planetary gear mechanism F from the drive shaft 40 to the intermediate driven shaft 52 and from the intermediate driven shaft through the locked reverse planetary gear mechanism R to the tail shaft of the transmission.

*Transmission in high—engine dead or running—car coasting or being pushed—throttle closed—as shown in Figure 27*

The relation of the several valves of the control means M of my invention, as shown in this figure, is the same in most respects as that shown in Figure 26 except that when the car is moving the rear pump 123 is being operated so that fluid under pressure is being delivered through the conduit 295 into the pressure chamber containing the ball valve 294 which is forced off of its seat by the pressure in the conduit 295 to charge the passageway 291 with fluid under pressure. The fluid under pressure in passageway 291 is delivered to the branch 299 thereof through groove 200 of the manual valve 168 to the branch 308 of the fluid passageway 310 into the pressure chamber 311 to shift the spring brake valve 215 to the right, as shown in Figure 27, to align the annular groove 217 thereof with the branch 320 of the fluid passageway 261 leading to the piston and cylinder means C with the branch 255 of passageway 249. Passageway 253 extending off of passageway 249 is caused to be connected with passageway 253' by the slot 214 of the throttle controlled valve 180 to effect the delivery of fluid under pressure to chamber 254 to shift the lockout valve 235 to the right and maintain the downshift valve 225 in position with the spring loaded ball detent 229 engaged in low groove 226 in which position the annular groove 231 of the downshift valve 225 is aligned with the fluid passageway 270 extending to chamber B. The passageway 264 by means of the branch 265 thereof is in alignment with the high branch 323 of the fluid passageway 240 through the annular groove 211 and the manual valve member 169. Also the branch 247 of the fluid passageway 240, together with the fluid passageway 249 extending to the branch passageway 255 affects delivery of fluid under pressure, as previously described, to the piston and cylinder means C. The coil spring brake 95 of the transmission of Figure 3 is being overrun but is conditioned for operation by engagement of the piston 96' of the piston and cylinder means C with the collar or ring member at the free end of coil spring 95.

*Transmission in high—engine dead or running—car moving or being pushed—throttle open—Figure 28*

In the condition illustrated by Figure 28 the throttle controlled valve 180 is in an intermediate position between its fully closed and fully open positions which is effective to exhaust the fluid pressure conduit 253'. The passageway 287 is also exhausted so that there is no pressure existing at either side of the lockout valve 235 or on the adjacent end of the downshift valve 225. Under these conditions the downshift valve 225 is held in position solely by the ball detent 229 engaging in the groove 226 and all functions of the control means M remain the same as those described in connection with Figure 27.

*Transmission being shifted from high to low (downshift)— engine running—car moving—throttle open—Figure 29*

The above condition occurs only when the driver of the vehicle after having manually shifted into the high range and then decides he would like to be in the low range without resorting to a manual shift by means of manipulating the shift lever 4 adjacent the steering wheel 2. This the driver may accomplish by depressing the accelerator pedal 18 to its fully open or downshift position. In this position the slot 214 of throttle controlled valve 180 connects passageways 290 and 302 so that fluid under pressure is delivered from the rear pump 123 through the conduit 295 past the ball valve 294 and into the conduit 291, through the passageway 290, the slot 214 in the throttle controlled valve 180, passageway 302 to the fluid pressure chamber 303, which causes shifting movement of the downshift valve 225 to the right to engage the ball detent 229 in the high groove 227 of the downshift valve 225 which shifting of the downshift valve 225 causes a reversal of the pressure conditions in chambers A and B, namely to bleed the chamber B through the fluid passageway 270 and to charge the fluid passageway 271 leading to chamber A, by virtue of the alignment of the annular grooves 230 and 231 of the downshift valve to connect the passageways previously described. It will be observed also that under these conditions the piston and cylinder means C remain energized so that the coil spring brake 95 of Figure 3 takes the reaction and continues the drive when the shift transition from high to low is taking place. The drive will continue to be in low range until the throttle controlled valve 180 is returned to its fully closed position, which when this occurs effects the delivery of fluid under pressure to the chamber 254 between the end of the end of the downshift valve 225 and lockout valve returning the downshift valve 225 to its low range position with the ball detent 229 engaged in the groove 226 thereof. Upon this manipulation of the accelerator pedal 18 and the throttle controlled valve 180, all of the conditions relevant to the high or direct drive range prevail.

*Transmission in reverse—engine running—car standing still—throttle closed—Figure 30*

As previously related the pair of manually operable valves 168 and 169, as shown in Figure 30, cannot be shifted from neutral into reverse position to cause the detent ball 206 to engage in the reverse notch 205 of the manual valve member 168 unless the throttle controlled valve 180 is in its fully closed position. Assuming that the throttle controlled valve is in its closed position reverse for the transmission is attained by energizing or admitting fluid under pressure into the cylinder for effecting axial movement of the piston D of Figure 3 and into the chamber B to effect direct or high drive through the planetary gear mechanism F. However, in order to engage the reverse positive brake, i. e., the brake sleeve 105 with the dog teeth 116 of the collar member 88 piston D must first be acted upon by fluid under pressure ahead of admission of fluid under pressure into chamber B. To accomplish this timing, the reverse clutch valve 216 controls delivery of fluid under pressure to chamber B only after the cylinder in which piston D operates has been fully engaged. The manual valve 168 when positioned as shown in Figure 30 aligns the annular groove 201 thereof with the branch passageway 247 and passageway 330 which connects with the fluid passageway 280 and through which the fluid under pressure passes through a branch fluid passageway 331 for delivering fluid under pressure from the torque converter pump $P_1$ to the cylinder in which the piston D operates. Thus, the manual valve 168 is effective to direct pressure to the fluid passageway 331 leading to the cylinder for piston D. The fluid pressure chamber 284 for the reverse clutch valve 216 receives the pressure from the fluid passageway 280 and is actuated by the back pressure which results after the piston D completes its travel to effect the shift in the reverse planetary gear mechanism R. The manual valve 169 by alignment of the annular groove 212 thereof with the reverse branch 335 off of the main supply passage 240 has connection with a branch 336 of the fluid passageway 243 with the fluid in the passageway 243 passing through the longitudinal slot 213 in the throttle controlled valve 180 in readiness for delivering this pressure to the fluid pressure line 287 in which the pressure chamber 288 is interposed for affecting locking of the inter lock plunger 208 in the event the throttle controlled valve 180 should be moved to its open position. This arrangement of the throttle controlled valve 180 is for insuring that no shift can be made by the driver out of reverse while the accelerator or throttle is depressed. This feature further provides for the safety of the driver as well as the transmission. Also it will be observed that the slot 214 in the throttle controlled valve 180 is effective to deliver fluid under pressure to the chamber 254 through passageways already described to keep the downshift valve 225 in its low position with the ball detent 229 engaged in the groove 226, and thus assuring that pressure will be directed through the fluid passageway 270 to the chamber B of the transmission of Figure 3.

*Transmission in reverse—engine running—car moving in reverse—throttle open—as shown in Figure 31*

As shown in the above figure the control means M of my invention represents the condition of the transmission actuated for reverse drive and with the throttle controlled valve 180 in its fully open or downshift position which as previously noted is effective to cause the lock-out valve 235 to keep the downshift valve 225 from down shifting from high to low with the interlock plunger 208 also being under the influence of pressure in the chamber 288 to prevent manual shifting of the manual selector valves 168 and 169. The throttle controlled valve 180 under these conditions effects the delivery of fluid under pressure to the chamber 288 and locks the manual valve members 168 and 169 against shifting movement while the engine is running faster than idle conditions. The throttle controlled valve 180 also directs pressure through the manual valve 168 to energize the piston and cylinder means C. The coil spring brake 95 of Figure 3 in reverse is of no importance since no reaction is taken on the sun gear of the forward planetary gear F.

*Transmission in reverse—engine dead—car being pushed forward—throttle open—as shown in Figure 32*

The condition represented by Figure 32 does not frequently occur in the operation of an automobile. However, if the engine is dead and the manual selector lever 4 is positioned in reverse to position the manual valves 168 and 169 to the positions shown in Figure 32 and the car is being pushed backward, the transmission remains in neutral for a lack of pressure from either of the pumps $P_1$ driven by the torque converter, or the rotor pump 123. However, in the event the automobile is being pushed forward with the manual valve in reverse, the rear pump 123 delivers fluid to the conduit 295 past the ball check valve 294 and charges the passageway 291 with fluid under pressure. As shown the arrangement of the valve is such so that the passageway 261 leading to the piston and cylinder means C—the passageway 270 leading to chamber B and the passageway 280 leading to the cylinder in which piston D reciprocates are charged with fluid pressure which is effective to condition the transmission for reverse drive through the planetary gear mechanism R while the car is going forward which results in sliding of the rear wheels or slipping of the clutch means comprising the pair of torque transmitting members 69 and 77. The remainder of the functions of the valve control means of my invention with respect to Figure 32 are the same as those described in connection with Figure 31.

While I have shown what I consider to be a preferred embodiment of a control means constructed in accordance with my invention it will be understood that various modifications and rearrangements may be made therein without departing from the spirit and scope of my invention.

I claim:

1. For use in a transmission having planetary gear means providing low and high ratio drives between drive and driven shafts thereof, and torque transmitting means associated with said planetary gear means to effect selectively said low or high ratio drive through the latter, control means comprising manually shiftable valve means having a neutral position and shiftable from said neutral position to control selectively the actuation of said torque transmitting means to effect either said low or high ratio drive through said planetary gear means, manually operable throttle controlled valve means, and means between said throttle controlled valve means and said shiftable valve means for preventing shifting of the latter except in a predetermined position of said throttle controlled valve means.

2. For use in a transmission having gear means providing low and high ratio drives between drive and driven shafts thereof, and fluid pressure responsive torque transmitting means associated with said gear means for selectively effecting said low or high ratio drive through the latter, control means adapted to have connection with a source of fluid under pressure comprising, manually shiftable valve means having a neutral position and shiftable from said neutral position to connect said source of fluid under pressure with said torque transmitting means to control selectively actuation of the latter to effect either said high or low ratio drive, manually operable throttle controlled valve means, and fluid pressure responsive means between said throttle controlled valve means and said shiftable valve means for preventing shifting of the latter except in a predetermined position of said throttle controlled valve means.

3. For use in a transmission having gear means providing low and high ratio drives between drive and driven shafts thereof, fluid pressure responsive torque transmitting means associated with said gear means for selectively effecting said low or high ratio drive through the latter, and brake means adapted to be selectively conditioned for operation to prevent breaking of the driving connection between said drive and driven shafts in the actuation of said torque transmitting means in effecting low to high ratio drive, or vice versa through said gear means, control means adapted to have connection with a source of fluid under pressure comprising, passageway means for conducting fluid under pressure to said torque transmitting means to actuate the latter to effect said low ratio drive, manually shiftable valve means for connecting said passageway with said source of fluid under pressure, second passageway means for conducting fluid under pressure to said brake means to condition the same for operation, and means including manually shiftable throttle controlled valve means adapted upon predetermined shifting movement of the latter for connecting said second passageway with said source of fluid under pressure to condition said brake means for operation.

4. For use in a transmission having gear means providing low and high ratio drives between drive and driven shafts thereof, fluid pressure responsive torque transmitting means associated with said gear means for selectively effecting said low or high ratio drive through the latter, and brake means adapted to be selectively conditioned for operation to prevent breaking of the driving connection between said drive and driven shafts in the actuation of said torque transmitting means in effecting low to high ratio drive, or vice versa through said gear means, control means adapted to have connection with fluid under pressure comprising, first passageway means for conducting fluid under pressure to said torque transmitting means to actuate the latter to effect said low ratio drive, second passageway means having connection with said first passageway means for conducting fluid under pressure to said brake means to condition the same for operation, brake valve means normally maintaining said second passageway closed, third passageway means for conducting fluid under pressure for effecting movement of said brake valve means to open said normally closed second passageway, manually shiftable valve means for connecting said first passageway with fluid under pressure, and manually shiftable throttle controlled valve means adapted upon predetermined shifting movement of the same to connect said third passageway with fluid under pressure and thereby effect movement of said throttle controlled valve means to open said normally closed second passageway to deliver fluid under pressure to said brake means and condition the latter for operation.

5. For use in a transmission having gear means providing low and high ratio drives between drive and driven shafts thereof, fluid pressure responsive torque transmitting means associated with said gear means for selectively effecting said low or high ratio drives through the latter, control means adapted to have connection with fluid under pressure comprising, first fluid passageway means between said fluid under pressure and said torque transmitting means, manually shiftable valve means normally closing said first passageway and shiftable to open the latter to effect delivery of fluid under pressure to said torque transmitting means to effect said low ratio drive, second fluid passageway means between said fluid under pressure and said torque transmitting means, shiftable downshift valve means normally maintaining said second passageway closed, third fluid passageway means between said fluid under pressure and said downshift valve means, and manually shiftable throttle controlled valve means in said third passageway normally maintaining the latter closed and adapted in a predetermined position thereof to open said third passageway to effect movement of said downshift valve to close said first passageway and open said second passageway.

6. For use in a transmission having gear means providing low and high ratio drives between drive and driven shafts thereof, fluid pressure responsive torque transmitting means associated with said gear means for selectively effecting said low or high ratio drive through the latter, and brake means adapted to be selectively conditioned for operation to prevent breaking of the driving connection between said drive and driven shafts in the actuation of said torque transmitting means in effecting low to high ratio drive, or vice versa through said gear means, control means adapted to have connection with fluid under pressure comprising first fluid passageway means between said fluid under pressure and said torque transmitting means, manually shiftable valve means normally closing said first passageway and shiftable to open the latter to effect delivery of fluid under pressure to said torque transmitting means to effect said low ratio drive, second fluid passageway means between said fluid under pressure and said torque transmitting means, shiftable downshift valve means normally maintaining said second passageway closed, third fluid passageway means for conducting fluid under pressure to said brake means to condition the latter for operation, brake valve means in said third passageway normally closing the latter, fourth fluid passageway means for conducting fluid under pressure to said brake valve means, said manually shiftable valve means normally closing said fourth passageway and operable when shifted to effect said low ratio drive to open said fourth passageway and operable when shifted to effect said low ratio drive to open said fourth passageway and effect movement of said brake valve means to open said third passageway and condition said brake means for operation, fifth fluid passageway means between said fluid under pressure and said downshift valve means, and manually shiftable throttle controlled valve means in said fifth passageway normally maintaining the latter closed and adapted in a predetermined position thereof to open said fifth passageway to effect movement of said downshift valve to close said first passageway and open said second passageway.

7. For use in a transmission having gear means providing low and high ratio drives between drive and driven shafts thereof, and torque transmitting means associated with said gear means to effect selectively said low or high ratio drive through the latter, control means adapted to have connection with fluid under pressure comprising first passageway means for conducting fluid under pressure to said torque transmitting means to actuate the latter to effect said low ratio drive, downshift valve means associated with said first passageway for opening and closing the same and normally disposed in its open position, manually shiftable valve means for closing said first passageway and shiftable to open the latter to effect delivery of fluid under pressure to said torque transmitting means and effect said low ratio drive, second fluid passageway means for conducting fluid under pressure to said downshift valve means, and throttle controlled valve means associated with said second passageway to open and close the same and adapted in its closed position to open said second passageway to effect delivery of fluid under pressure to said downshift valve means to prevent movement thereof from its normally open position.

8. For use in a transmission having gear means providing low and high ratio drives between drive and driven shafts thereof, fluid pressure responsive torque transmitting means associated with said gear means for selectively effecting said low or high ratio drive through the latter, and brake means adapted to be selectively conditioned for operation to prevent breaking of the driving connection between said drive and driven shafts in the actuation of said torque transmitting means in effecting low to high ratio drive, or vice versa through said gear means, control means adapted to have connection with fluid under pressure comprising, first fluid passageway means for conducting fluid under pressure to said torque transmitting means to actuate the latter to effect said low ratio drive, a downshift valve associated with said first passageway for opening and closing the same and normally disposed in position opening said first passageway, second fluid passageway means for conducting fluid under pressure to said torque transmitting means for maintaining said low ratio drive, said downshift valve normally maintaining said second passageway closed, third fluid passageway means for conducting fluid under pressure to one end of said downshift valve means, fourth fluid passageway means for conducting fluid under pressure to the other end of said downshift valve, and throttle controlled valve means associated with said third and fourth fluid passageways adapted in one predetermined position thereof to open said third passageway to effect delivery of fluid under pressure to said downshift valve to prevent movement thereof from its position normally opening said first passageway, and adapted in a second predetermined position thereof for effecting delivery of fluid under pressure through said fourth passageway and effect movement of said down shift valve for its position normally opening said first passageway to close the same and open said second passageway.

9. For use in a transmission having gear means providing low and high ratio drives between drive and driven shafts thereof, and fluid pressure responsive torque transmitting means associated with said gear means for effecting selectively said low or high ratio drive through the latter, control means adapted to have connection with fluid under pressure comprising, first fluid passageway means for conducting fluid under pressure to said torque transmitting means, manually shiftable valve means associated with said first passageway normally closing the same and shiftable to open said passageway to effect said high ratio drive, downshift valve means associated with said first passageway positionable for opening and closing the same, manually shiftable valve means associated with said first passageway to effect said high ratio drive, second passageway means for conducting fluid under pressure to said downshift valve means, and manually shiftable throttle controlled valve means associated with said second passageway and being adapted in a predetermined position thereof to open said second passageway admitting fluid under pressure to said downshift valve means to prevent movement of the same to a position closing said first passageway in the shifted position of said manually shiftable valve means to effect said high ratio drive.

10. For use in a transmission having gear means providing low and high ratio drives between drive and driven shafts thereof, fluid pressure responsive torque transmitting means associated with said gear means for selectively effecting said low or high ratio drives through the latter, and brake means adapted to be conditioned selectively for operation to prevent breaking of the driving connection between said drive and driven shafts in the actuation of said torque transmitting means in effecting low to high ratio drive, or vice versa through said gear means, control means adapted to have connection with fluid under pressure comprising, first fluid passageway means for conducting fluid under pressure to said torque transmitting means, down shift valve means associated with said first passageway positionable for opening and closing said first passageway, manually shiftable valve means associated with said first passageway normally closing the same and shiftable to open said passageway to effect said high ratio drive, second passageway means for conducting fluid under pressure to said down shift valve means, manually shiftable throttle controlled valve means associated with said second passageway and being adapted in a predetermined position thereof to open said second passageway admitting fluid under pressure to said down shift valve means to prevent movement of the same to a position closing said first passageway in the shifted position of said manually shiftable valve means to effect said high ratio drive, third passageway means for conducting fluid under pressure to said brake means to condition the latter for operation, brake valve means associated with said third passageway and normally closing the same, fourth fluid passageway means for effecting shifting of said brake valve means to open said third passageway associated with said manually shiftable valve means and adapted to be opened and closed thereby, said manually shiftable valve means being adapted in the position thereof to effect high ratio drive to open said fourth fluid passageway and effect shifting of said brake valve means to open said third passageway.

11. For use in a transmission having gear means providing low and high ratio drives between drive and driven shafts thereof, fluid pressure responsive torque transmitting means associated with said gear means for selectively effecting said low or high ratio drives through the latter, and brake means adapted to be conditioned selectively for operation to prevent breaking of the driving connection between said drive and driven shafts in the actuation of said torque transmitting means in effecting low to high ratio drive, or vice versa through said gear means, control means adapted to have connection with fluid under pressure comprising, first fluid passageway means for conducting fluid under pressure to said torque transmitting means, manually shiftable valve means associated with said first fluid passageway normally closing the same and positionable to open said first passageway to effect said high ratio drive, second fluid passageway means for conducting fluid under pressure to said brake means to condition the latter for operation, brake valve means in said second passageway means normally maintaining the latter closed, third passageway means for conducting fluid under pressure to said brake valve means for effecting movement of the same to open said second passageway, and manually shiftable throttle controlled valve means associated with said third passageway and being adapted in a predetermined position thereof to open said third passageway to effect delivery of fluid under pressure to said second passageway to condition said brake means for operation.

12. For use in a transmission having gear means providing low and high ratio drives between drive and driven shafts thereof, fluid pressure responsive torque transmitting means associated with said gear means for selectively effecting said low or high ratio drives through the latter, and brake means adapted to be conditioned selectively for operation to prevent breaking of the driving connection between said drive and driven shafts in the actuation of said torque transmitting means in effecting low to high ratio drive, or vice versa through said gear means, control means adapted to have connection with fluid under pressure comprising, first fluid passageway means for conducting fluid under pressure to said torque transmitting means, manually shiftable valve means associated with said first fluid passageway normally closing the same and positionable to open said first passageway to effect said high ratio drive, second fluid passageway means for conducting fluid under pressure to said brake means to condition the latter for operation, brake valve means in said second passageway means normally maintaining the latter closed, third passageway means for conducting fluid under pressure to said brake valve means for effecting movement of the same to open said second passageway associated with said manually shiftable valve means, said third passageway being adapted to be connected with fluid under pressure upon shifting of said manually shiftable valve means to open said first passageway to effect said high ratio drive whereby said brake means is caused to be conditioned for operation by fluid under pressure in said second passageway.

13. For use in a transmission having gear means providing low and high ratio drives between drive and driven shafts thereof, fluid pressure responsive torque transmitting means associated with said gear means for selectively effecting said low or high ratio drives through the latter, and brake means adapted to be conditioned selectively for operation to prevent breaking of the driving connection between said drive and driven shafts in the actuation of said torque transmitting means in effecting low to high ratio drive, or vice versa through said gear means, control means adapted to have connection with fluid under pressure comprising, first fluid passageway means for conducting fluid under pressure to said torque transmitting means, manually shiftable valve means associated with said first passageway normally closing the same and positionable to open said first passageway to effect said high ratio drive, second fluid passageway means for conducting fluid under pressure to said torque transmitting means to effect said low ratio drive, down shift valve means associated with said first and second passageways and in the aforesaid position of said manually shiftable valve means closing said second passageway, third fluid passageway means for conducting fluid under pressure to said down shift valve means to effect shifting of the same to close said first passageway and open said second passageway, and manually operable throttle controlled valve means associated with said third passageway and operable in a predetermined position thereof to open said third passageway and effect shifting of said down shift valve means to close said first passageway and open said second passageway and thereby effect the shift in said gear means from high ratio drive to low ratio drive.

14. For use in a transmission having gear means providing low and high ratio drives between drive and driven shafts thereof, fluid pressure responsive torque transmitting means associated with said gear means for selectively effecting said low or high ratio drives through the latter, and brake means adapted to be conditioned selectively for operation to prevent breaking of the driving connection between said drive and driven shafts in the actuation of said torque transmitting means in effecting low to high ratio drive, or vice versa through said gear means, control means adapted to have connection with fluid under pressure comprising, first fluid passageway means for conducting fluid under pressure to said torque transmitting means, manually shiftable valve means associated with said first passageway normally closing the same and positionable to open said first passageway to effect said high ratio drive, second fluid passageway means for conducting fluid under pressure to said torque transmitting means to effect said low ratio drive, down shift valve means associated with said first and second passageways and in the aforesaid position of said manually shiftable valve means closing said second passageway, third fluid passageway means for conducting fluid under pressure to said down shift valve means to effect shifting of the same to close said first passageway and open said second passageway, manually operable throttle controlled valve means associated with said third passageway and operable in a predetermined position thereof to open said third passageway and effect shifting of said down shift valve means to close said first passageway and open said second passageway and thereby effect the shift in said gear means from high ratio drive to low ratio drive, fourth fluid pasageway means for conducting fluid under pressure to said brake means to condition the latter for operation, brake valve means normally maintaining said fourth fluid passageway closed, fifth fluid passageway means for conducting fluid under pressure to said brake valve means associated with said manually shiftable valve means and adapted to be opened in the aforesaid position of the latter to effect opening of said fourth fluid passageway and condition said brake means for operation to prevent breaking of the driving connection between said drive and driven shaft upon actuation of said throttle controlled valve means to effect said shift in said gear means.

15. For use in a transmission having gear means providing low and high ratio drives between drive and driven shafts thereof, fluid pressure responsive torque transmitting means associated with said gear means for selectively effecting said low or high ratio drives through the latter, and brake means adapted to be conditioned selectively for operation to prevent breaking of the driving connection between said drive and driven shafts in the actuation of said torque transmitting means in effecting low to high ratio drive, or vice versa through said gear means, control means adapted to have connection with fluid under pressure comprising, first fluid passageway means for conducting fluid under pressure to said torque transmitting means, manually shiftable valve means associated with said first passageway normally closing the same and positionable to open said first passageway to effect said high ratio drive, second fluid passageway means for conducting fluid under pressure to said torque transmitting means to effect said low ratio drive, down shift valve means associated with said first and second passageways and in the aforesaid position of said manually shiftable valve means closing said second passageway, third fluid passageway means for conducting fluid under pressure to said down shift valve means to effect shifting of the same to close said first passageway and open said second passageway, manually operable throttle controlled valve means associated with said third passageway and operable in a predetermined position thereof to open said third passageway and effect shifting of said down shift valve means to close said first passageway and open said second passageway and thereby effect the shift in said gear means from high ratio drive to low ratio drive, and means for conducting fluid under pressure to said brake means to condition the same for operation upon actuation of said throttle controlled valve means to effect shifting from high to low ratio drive in said gear means.

16. For use in a transmission having gear means providing forward and reverse drives between drive and driven shafts, and including selectively operable fluid responsive clutch and brake means for effecting said reverse drive, control means adapted to have connection with fluid under pressure comprising, fluid passageway means for conducting fluid under pressure to said clutch and brake means, manually shiftable valve means normally closing said passageway and positionable to open the same, and manually shiftable throttle controlled valve means adapted in a predetermined position thereof to prevent shifting of said manual shiftable valve means to a position closing said fluid passageway.

17. For use in a transmission having first gear means between drive and intermediate driven shafts, fluid pressure responsive torque transmitting means associated with said gear means for drivingly connecting said drive and intermediate driven shafts in a forward direction, second gear means between said intermediate driven shaft and a tail shaft, and fluid pressure responsive clutch and brake means associated with said second gear means for drivingly connecting said tail shaft with said intermediate driven shaft to drive said tail shaft in a reverse direction, control means adapted to have connection with a source of fluid under pressure comprising, first fluid passageway means for conducting fluid under pressure to said clutch and brake means, second fluid passageway means for conducting fluid under pressure to said torque transmitting means, manually shiftable valve means having a neutral position closing said first and second passageways and shiftable from said neutral position to open said first and second passageways, and manually shiftable throttle controlled valve means adapted in a predetermined position thereof to prevent shifting of said manual shiftable valve means to a position closing said first and second fluid passageways.

18. For use in a transmission having first gear means between drive and intermediate driven shafts, fluid pressure responsive torque transmitting means associated with said gear means for drivingly connecting said drive and intermediate driven shafts in a forward direction, second gear means between said intermediate driven shaft and a tail shaft, and fluid pressure responsive clutch and brake means associated with said second gear means for drivingly connecting said tail shaft with said intermediate driven shaft to drive said tail shaft in a reverse direction, control means adapted to have connection with a source of fluid under pressure comprising, first fluid passageway means for conducting fluid under pressure to said clutch and brake means, second fluid passageway means for conducting fluid under pressure to said torque transmitting means, manually shiftable valve means having a neutral position closing said first and second passageways and shiftable from said neutral position to open said first and second passageways, and manually shiftable throttle controlled valve means adapted in a predetermined position thereof to prevent shifting of said manual shiftable valve means to a position closing said first and second fluid passageways, down shift valve means associated with said second passageway for opening and closing the same, third fluid passageway means for conducting fluid under pressure to said down shift valve means, and said manually shiftable throttle controlled valve means being associated with said third passageway and being adapted in a predetermined position thereof for opening said third fluid passageway to effect delivery of fluid under pressure to said down shift valve means to prevent movement of the latter to a position closing said second passageway.

19. For use in a transmission having first gear means between drive and intermediate driven shafts, fluid pressure responsive torque transmitting means associated with said gear means for drivingly connecting said drive and intermediate driven shafts in a forward direction, second gear means between said intermediate driven shaft and a tail shaft, and fluid pressure responsive clutch and brake means associated with said second gear means for drivingly connecting said tail shaft with said intermediate driven shaft to drive said tail shaft in a reverse direction, control means adapted to have connection with a source of fluid under pressure comprising, first fluid passageway means for conducting fluid under pressure to said clutch and brake means, second fluid passageway means for conducting fluid under pressure to said torque transmitting means, manually shiftable valve means having a neutral position closing said first and second passageways and shiftable from said neutral position to open said first and second passageways, and manually shiftable throttle controlled valve means adapted in a predetermined position thereof to prevent shifting of said manual shiftable valve means to a position closing said first and second fluid passageways, down shift valve means associated with said second passageway for opening and closing the same, third fluid passageway means for conducting fluid under pressure to said down shift valve means, said manually shiftable throttle controlled valve means being associated with said third passageway and being adapted in a predetermined position thereof for opening said third fluid passageway to effect delivery of fluid under pressure to said down shift valve means to prevent movement of the latter to a position closing said second passageway, interlock valve means associated with said manually shiftable valve means, fourth fluid passageway means for conducting fluid under pressure to said interlock valve means, and said throttle controlled valve means being associated with said fourth passageway for opening and closing the same and being adapted in a predetermined position thereof to open said fourth passageway to prevent movement of said manually shiftable valve means.

20. For use in a transmission having gear means providing low and high drive ratios between drive and driven shafts thereof, and torque transmitting means associated with said gear means to effect selectively said low or high drive ratios through the latter, control means adapted to have connection with fluid under pressure comprising first fluid passageway means for conducting fluid under pressure to said torque transmitting means to effect said low ratio drive, second fluid passageway means for conducting fluid under pressure to said torque transmitting means to effect said high ratio drive, manually operable valve means having a neutral position normally closing said first and second passageways, down shift valve means associated with said first and second passageways and positionable for opening and closing the same, third fluid passageway means for conducting fluid under pressure to said down shift valve means, and manually operable throttle controlled valve means associated with said third passageway and operable in a predetermined position thereof to open said third passageway whereby fluid under pressure is adapted to be delivered through said third passageway to said down shift valve means to prevent movement thereof to open either of said first or second passageways when said manually operable valve means is disposed in its neutral position.

21. For use in a transmission having gear means providing low and high drive ratios between drive and driven shafts thereof, and torque transmitting means associated with said gear means to effect selectively said low or high drive ratios through the latter, control means adapted to have connection with fluid under pressure comprising first fluid passageway means for conducting fluid under pressure to said torque transmitting means to effect said low ratio drive, second fluid passageway means for conducting fluid under pressure to said torque transmitting means to effect said high ratio drive, manually operable valve means having a neutral position normally closing said first and second passageways, down shift valve means associated with said first and second passageways and positionable for opening and closing the same, lockout valve means associated with said down shift valve means, third fluid passageway means for conducting fluid under pressure to said lockout valve means, and manually operable throttle controlled valve means associated with said third passageway and operable in a predetermined position thereof to open said third passageway whereby fluid under pressure is adapted to be delivered through said third passageway to said lockout valve to engage the same with said down shift valve means to prevent movement thereof to open either of said first or second passageways in the neutral position of said manually operable valve means.

22. For use in a transmission having gear means providing low and high drive ratios between drive and driven shafts thereof, and torque transmitting means associated with said gear means to effect selectively said low or high drive ratios through the latter, control means adapted to have connection with fluid under pressure comprising first fluid passageway means for conducting fluid under pressure to said torque transmitting means to effect said low ratio drive, second fluid passageway means for conducting fluid under pressure to said torque transmitting means to effect said high ratio drive, manually operable valve means having a neutral position normally closing said first and second passageways, down shift valve means associated with said first and second passageways and positionable for opening and closing the same, lockout valve means associated with said down shift valve means, third fluid passageway means for conducting fluid under pressure to said lockout valve means, interlock valve means associated with said manually operable valve means, fourth fluid passageway means for conducting fluid under pressure to said interlock valve means, and manually operable throttle controlled valve means associated with said third and fourth passageways and operable in a predetermined position thereof to open said third and fourth passageways whereby fluid under pressure is adapted to be delivered through said third and fourth passageways to said lockout valve means and said interlock valve means to prevent movement of said down shift valve means to open either of said first or second passageways in the neutral position of said manually operable valve means, and to prevent movement of said manually operable valve means from the neutral position thereof, respectively.

23. For use in a transmission having gear means providing low and high drive ratios between drive and driven shafts thereof, and torque transmitting means associated with said gear means to effect selectively said low or high drive ratios through the latter, control means adapted to have connection with fluid under pressure comprising first fluid passageway means for conducting fluid under pressure to said torque transmitting means to effect said low ratio drive, second fluid passageway means for conducting fluid under pressure to said torque transmitting means to effect said high ratio drive, manually operable valve means having a neutral position normally closing said first and second passageways, down shift valve means associated with said first and second passageways and positionable for opening and closing the same, interlock valve means associated with said manually operable valve means, third fluid passageway means for conducting fluid under pressure to said interlock valve means, and manually operable throttle controlled valve means associated with said third passageway and operable in a predetermined position thereof to open said third passageway whereby fluid under pressure is adapted to be delivered through said third passageway to said interlock valve means to prevent movement of said manually operable valve means from the neutral position thereof.

24. For use in a transmission having first gear means between drive and intermediate driven shafts, fluid pressure responsive torque transmitting means associated with said gear means for drivingly connecting said drive and intermediate driven shafts in a forward direction, second gear means between said intermediate driven shaft and a tail shaft, and fluid pressure responsive clutch and brake means associated with said second gear means for drivingly connecting said tail shaft with said intermediate driven shaft to drive said tail shaft in a reverse direction, control means adapted to have connection with a source of fluid under pressure comprising, first fluid passageway means for conducting fluid under pressure to said clutch and brake means, second fluid passageway means for conducting fluid under pressure to said torque transmitting means, reverse valve means associated with said first and second passageways and normally closing said second passageway, manually shiftable valve means having a neutral position closing said first and second passageways and shiftable from said neutral position to a position to open said passageways, said manual valve means when shifted to said open position admitting fluid under pressure through said first passageway to said clutch and brake means for actuating the same, and said fluid under pressure in said first passageway after actuation of said clutch and brake means being adapted to effect shifting of said reverse valve means to open said second passageway to admit fluid under pressure therethrough to said torque transmitting means.

25. For use in a transmission having first gear means between drive and intermediate driven shafts, fluid pressure responsive torque transmitting means associated with said gear means for drivingly connecting said drive and intermediate driven shafts in a forward direction, second gear means between said intermediate driven shaft and a tail shaft, and fluid pressure responsive clutch and brake means associated with said second gear means for drivingly connecting said tail shaft with said intermediate driven shaft to drive said tail shaft in a reverse direction, control means adapted to have connection with a source of fluid under pressure comprising, first fluid passageway means for conducting fluid under pressure to said clutch and brake means, second fluid passageway means for conducting fluid under pressure to said torque transmitting means, reverse valve means associated with said first and second passageways and normally closing said second passageway, manually shiftable valve means having a neutral position closing said first and second passageways and shiftable from said neutral position to a position to open said passageways, said manual valve means when shifted to said open position admitting fluid under pressure through said first passageway to said clutch and brake means for actuating the same, and said fluid under pressure in said first passageway after actuation of said clutch and brake means being adapted to effect shifting of said reverse valve means to open said second passageway to admit fluid under pressure therethrough to said torque transmitting means and means including manually operable throttle controlled valve means adapted in a predetermined position of the latter to prevent movement of said manual valve means.

26. For use with a transmission having gear means providing low and high ratio drives between drive and driven shafts thereof, and torque transmitting means associated with said gear means to effect selectively said low or high ratio drive through the latter, control means comprising manually shiftable selector means having a neutral position and shiftable from said neutral position to positions to effect selectively said low or high ratio drives, and means including manually operable throttle controlled means associated with said selector means adapted in a predetermined position of said throttle controlled means for preventing shifting of said selector means from its neutral position to either of its positions for effecting said low or high ratio drives.

27. For use with a transmission having gear means providing low ratio drive between drive and driven shafts thereof, and torque transmitting means associated with said gear means to effect said low ratio drive through the latter, control means comprising manually shiftable selector means having a neutral position and shiftable from said neutral position to a first position for effecting said low ratio drive, downshift means positionable for effecting said low ratio drive upon shifting of said selector means to said first position, and manually operable throttle controlled means associated with said downshift means and adapted in a predetermined position thereof to prevent movement of said down shift means from its position effecting said low ratio drive.

28. For use with a transmission having gear means providing low and high ratio drives between drive and driven shafts thereof, torque transmitting means associated with said gear means for selectively effecting said low or high ratio drives, and brake means adapted to be conditioned for operation to prevent breaking of the driving connection between said drive and driven shafts in the actuation of said torque transmitting means in effecting low to high ratio drive through said gear means, control means comprising, manually shiftable selector means having a neutral position and shiftable from said neutral position for effecting selectively said low ratio drive, downshift means positionable for effecting said low ratio drive upon shifting of said selector means to effect said low ratio drive, and means including manually operable throttle controlled means adapted in a predetermined position of said throttle controlled means to condition said brake means for operation.

29. For use with a transmission having gear means providing low and high ratio drives between drive and driven shafts thereof, torque transmitting means associated with said gear means for selectively effecting said low or high ratio drives, and brake means adapted to be conditioned for operation to prevent breaking of the driving connection between said drive and driven shafts in the actuation of said torque transmitting means in effecting low to high ratio drive through said gear means, control means comprising, manually shiftable selector means having a neutral position and shiftable from said neutral position for effecting selectively said low ratio drive, down shift means positionable for effecting said low ratio drive upon shifting of said selector means to effect said low ratio drive, and means including manually operable throttle controlled means adapted in a predetermined position of said throttle controlled means condition said brake means for operation and said throttle controlled means in a second predetermined position thereof being adapted to prevent shifting of said downshift means from its position for effecting said low ratio drive.

30. For use with a transmission having gear means providing low and high ratio drives between drive and driven shafts thereof, torque transmitting means associated with said gear means for selectively effecting said low or high ratio drives, and brake means adapted to be conditioned for operation to prevent breaking of the driving connection between said drive and driven shafts in the actuation of said torque transmitting means in effecting low to high ratio drive through said gear means, control means comprising manually shiftable selector means having a neutral position and shiftable from said neutral position for effecting selectively said low ratio drive, downshift means positionable for effecting said high ratio drive upon shifting of said selector means to effect said high ratio drive, and means including manually operable throttle controlled valve means associated with said downshift means and adapted in a predetermined position thereof to prevent movement of said downshift means from its position for effecting said high ratio drive.

31. For use with a transmission having gear means providing low and high ratio drives between drive and driven shafts thereof, torque transmitting means associated with said gear means for selectively effecting said low or high ratio drives, and brake means adapted to be conditioned for operation to prevent breaking of the driving connection between said drive and driven shafts in the actuation of said torque transmitting means in effecting low to high ratio drive through said gear means, control means comprising manually shiftable selector means having a neutral position and shiftable from said neutral position for effecting selectively said low ratio drive, downshift means positionable for effecting said low ratio drive upon shifting of said selector means to effect said low ratio drive, and means including manually operable throttle controlled means adapted in a predetermined position of said throttle controlled means to condition said brake means for operation, and means adapted when said driven shaft is rotated to condition said brake means for operation.

32. For use with a transmission having gear means providing low and high ratio drives between drive and driven shafts thereof, torque transmitting means associated with said gear means for selectively effecting said low or high ratio drives, and brake means adapted to be conditioned for operation to prevent breaking of the driving connection between said drive and driven shafts in the actuation of said torque transmitting means in effecting low to high ratio drive through said gear means, control means comprising manually shiftable selector means having a neutral position and shiftable from said neutral position for effecting selectively said low ratio drive, downshift means positionable for effecting said high ratio drive upon shifting of said selector means to effect said high ratio drive, and means including manually operable throttle controlled valve means associated with said downshift means and adapted in a predetermined position thereof to prevent movement of said downshift means from its position for effecting said high ratio drive, said last named means in a second predetermined position of said throttle controlled means freeing said downshift means.

33. For use with a transmission having gear means providing low and high ratio drives between drive and driven shafts thereof, torque transmitting means associated with said gear means for selectively effecting said low or high ratio drives, and brake means adapted to be conditioned for operation to prevent breaking of the driving connection between said drive and driven shafts in the actuation of said torque transmitting means in effecting low to high ratio drive through said gear means, control means comprising manually shiftable selector means having a neutral position and shiftable from said neutral position for effecting selectively said low ratio drive, downshift means positionable for effecting said high ratio drive upon shifting of said selector means to effect the latter and being shiftable from said position to effect low ratio drive, and means including manually operable throttle controlled valve means adapted in positioning of the latter to a predetermined position to effect shifting of said downshift means from its position for effecting said high ratio drive to its position for effecting said low ratio drive.

34. For use with a transmission having gear means providing low and high ratio drives between drive and driven shafts thereof, torque transmitting means associated with said gear means selectively effecting said low or high ratio drives, and brake means adapted to be conditioned for operation to prevent breaking of the driving connection between said drive and driven shafts in the actuation of said torque transmitting means in effecting low to high ratio drive through said gear means, control means comprising manually shiftable selector means having a neutral position and shiftable from said neutral position for effecting selectively said low ratio drive, downshift means positionable for effecting said high ratio drive upon shifting of said selector means to effect the latter and being shiftable from said position to effect low ratio drive, and means including manually operable throttle controlled valve means adapted in positioning of the latter to a predetermined position to effect shifting of said downshift means from its position for effecting said high ratio drive to its position for effecting said low ratio drive, and means adapted when said driven shaft is rotating to condition said brake means for operation to prevent breaking of the driving connection between said drive and driven shafts during shifting from high ratio drive to low ratio drive.

35. For use in a transmission having first gear means between a drive shaft and an intermediate driven shaft, torque transmitting means associated with said gear means for drivingly connecting said drive and intermediate driven shafts, second gear means between said intermediate driven shaft and a tail shaft, and clutch and brake means for drivingly connecting said tail shaft with said intermediate driven shaft to drive said tail shaft in a reverse direction, control means comprising downshift means positionable for effecting actuation of said torque transmitting means and said clutch and brake means to effect said reverse drive, manually shiftable selector means having a neutral position and shiftable from said neutral position to a first position for effecting shifting of said downshift means for effecting actuation of said torque transmitting means and said clutch and brake means for said reverse drive, and means including manually operable throttle controlled valve means adapted in a predetermined position of said throttle controlled valve means for preventing shifting of said downshift means from said first position.

36. For use in a transmission having first gear means between a drive shaft and an intermediate driven shaft, torque transmitting means associated with said gear means for drivingly connecting said drive and intermediate driven shafts, second gear means between said intermediate driven shaft and a tail shaft, and clutch and brake means for drivingly connecting said tail shaft with said intermediate driven shaft to drive said tail shaft in a reverse direction, control means comprising downshift means positionable for effecting actuation of said torque transmitting means and said clutch and brake means to effect said reverse drive, manually shiftable selector means having a neutral position and shiftable from said neutral position to a first position effecting shifting of said downshift means for effecting actuation of said torque transmitting means and said clutch and brake means for said reverse drive, and means including manually operable throttle controlled valve means adapted in a predetermined position of said throttle controlled valve means for preventing shifting of said downshift means from said first position and means between said downshift means and said selector means for causing said clutch and brake means to be conditioned for actuation prior to said torque transmitting means.

37. For use in a transmission having first gear means between a drive shaft and an intermediate driven shaft, torque transmitting means associated with said gear means for drivingly connecting said drive and intermediate driven shafts, second gear means between said intermediate driven shaft and a tail shaft, and clutch and brake means for drivingly connecting said tail shaft with said intermediate driven shaft to drive said tail shaft in a reverse direction, control means comprising downshift means positionable for effecting actuation of said torque transmitting means and said clutch and brake means to effect said reverse drive, manually shiftable selector means having a neutral position and shiftable from said neutral position to a first position effecting shifting of said downshift means for effecting actuation of said torque transmitting means and said clutch and brake means for said reverse drive, and means including manually operable throttle controlled valve means adapted in a predetermined position of said throttle controlled valve means for preventing shifting of said downshift means from said first position means between said downshift means and said selector means for causing said clutch and brake means to be conditioned for actuation prior to said torque transmitting means and means including said manually operable throttle controlled valve means adapted in a predetermined position thereof for preventing shifting of said downshift means from said first position.

38. For use with a transmission having gear means providing low and high ratio drives between drive and driven shafts thereof, torque transmitting means associated with said gear means for selectively effecting said low or high ratio drives, and brake means adapted to be conditioned for operation to prevent breaking of the driving connection between said drive and driven shafts in the actuation of said torque transmitting means in effecting low to high ratio drive through said gear means, control means comprising, means including manually operable selector means positionable for effecting selectively said high or low ratio drive, and means including manually operable throttle controlled valve means adapted in a predetermined position of said throttle controlled valve means for conditioning said brake means for operation when said selector means is positioned to effect said low to high ratio drive.

39. For use with a transmission having gear means providing low and high ratio drives between drive and driven shafts thereof, torque transmitting means associated with said gear means for selectively effecting said low or high ratio drives, and brake means adapted to be conditioned for operation to prevent breaking of the driving connection between said drive and driven shafts in the actuation of said torque transmitting means in effecting low to high ratio drive through said gear means, control means comprising, means including manually operable selector means positionable for effecting said low ratio drive, and means including manually operable throttle controlled valve means in a predetermined position of the latter for conditioning said brake means for operation when said selector means is positioned for effecting said low ratio drive.

40. For use with a transmission having gear means providing low and high ratio drives between drive and driven shafts thereof, torque transmitting means associated with said gear means for selectively effecting said low or high ratio drive, and brake means adapted to be conditioned for operation to prevent breaking of the driving connection between said drive and driven shafts in the actuation of said torque transmitting means in effecting low to high ratio drive, or vice versa, through said gear means, control means comprising, means including manually operable selector means positionable for effecting selectively said high or low ratio drive, means including manually operable throttle controlled valve means adapted in a predetermined position of said throttle controlled valve means for conditioning said brake means for operation when said selector means is positioned to effect said low ratio drive, and said manually operable throttle controlled valve means in a predetermined position of the latter being adapted to maintain said first means in position for effecting said low ratio drive.

41. For use with a transmission having gear means providing low and high ratio drives between drive and driven shafts thereof, torque transmitting means associated with said gear means for selectively effecting said low or high ratio drive, and brake means adapted to be conditioned for operation to prevent breaking of the driving connection between said drive and driven shafts in the actuation of said torque transmitting means in effecting low to high ratio drive, or vice versa, through said gear means, control means comprising, means including manually operable selector means positionable for effecting selectively said high ratio drive, means including manually operable throttle controlled valve means adapted in a predetermined position of the latter for conditioning said brake means for operation when said selector means is positioned to effect said high or low ratio drive, and said throttle controlled valve means in a predetermined position of the latter being adapted to maintain said first means in position for effecting said high ratio drive.

42. For use with a transmission having gear means providing low and high ratio drives between drive and driven shafts thereof, torque transmitting means associated with said gear means for selectively effecting said low or high ratio drives, and brake means adapted to be conditioned for operation to prevent breaking of the driving connection between said drive and driven shafts in the actuation of said torque transmitting means in effecting low to high ratio drive through said gear means, control means comprising, manually shiftable selector means having a neutral position and shiftable from said neutral position for effecting selectively said low ratio drive, means including manually operable selector means for effecting said high ratio drive, means including manually operable throttle controlled valve means adapted in a predetermined position of the latter to effect actuation of said first means to effect movement of said torque transmitting means and shift said gear means from said high ratio drive to said low ratio drive.

43. For use with a transmission having gear means providing low and high ratio drives between drive and driven shafts thereof, torque transmitting means associated with said gear means for selectively effecting said low or high ratio drives, and brake means adapted to be conditioned for operation to prevent breaking of the driving connection between said drive and driven shafts in the actuation of said torque transmitting means in effecting low to high ratio drive through said gear means, control means comprising manually shiftable selector means having a neutral position and shiftable from said neutral position for effecting selectively said low ratio drive, means including manually operable selector means for effecting said high ratio drive, means including manually operable throttle controlled valve means adapted in a predetermined position of the latter to effect actuation of said first means to effect movement of said torque transmitting means and shift said gear means from said high ratio drive to said low ratio drive, and means for conditioning said brake means for operation in the aforesaid shifting from high to low ratio drive.

44. For use in a transmission having first gear means between a drive shaft and an intermediate driven shaft, torque transmitting means associated with said gear means for drivingly connecting said drive and intermediate driven shafts, second gear means between said intermediate driven shaft and a tail shaft, and clutch and brake means for drivingly connecting said tail shaft with said intermediate driven shaft to drive said tail shaft in a reverse direction, control means comprising, means including manually shiftable selector means for effecting said reverse drive, and means including manually operable throttle controlled valve means adapted in a predetermined position of said throttle controlled valve means for maintaining said first means in position for effecting said reverse drive.

45. For use in a transmission having gear means providing low and high ratio drives between drive and driven shafts thereof, and fluid pressure responsive torque transmitting means associated with said gear means for selectively effecting said low and high ratio drive through the latter, control means adapted to have connection with fluid under pressure delivered from first and second pump means associated with said drive and driven shafts, respectively, comprising, means including manually shiftable selector means having a neutral position and shiftable from said neutral position to effect the delivery of fluid under pressure to said torque transmitting means to control selectively actuation of the latter to effect either said high or low ratio drive, and means including manually operable throttle controlled valve means for preventing shifting of said selector means except in a predetermined position of said throttle controlled valve means.

46. For use in a transmission having gear means providing low and high ratio drives between drive and driven shafts thereof, fluid pressure responsive torque transmitting means associated with said gear means for selectively effecting said low or high ratio drive through the latter, and brake means adapted to be selectively conditioned for operation to prevent breaking of the driving connection between said drive and driven shafts in the actuation of said torque transmitting means in effecting low to high ratio drive, or vice versa through said gear means, control means adapted to have connection with fluid under pressure delivered from first and second pump means associated with said drive and driven shafts, respectively, comprising means including manually shiftable selector means shiftable from a neutral position to connect said torque transmitting means with fluid under pressure to control selectively actuation of said gear means to effect either said high or low ratio drives, and means associated with said pump means driven by said driven shaft for delivering fluid under pressure to said brake means to selectively condition the latter for operation, and means including manually shiftable throttle controlled valve means adapted in a predetermined position of said throttle controlled valve means for conditioning said first means to render fluid under pressure available for effecting actuation of said torque transmitting means for high ratio drive.

47. For use in a transmission having gear means providing low and high ratio drives between drive and driven shafts thereof, fluid pressure responsive torque transmitting means associated with said gear means for selectively effecting said low or high ratio drive through the latter, and brake means adapted to be selectively conditioned for operation to prevent breaking of the driving connection between said drive and driven shafts in the actuation of said torque transmitting means in effecting low to high ratio drive, or vice versa through said gear means, control means adapted to have connection with fluid under pressure delivered from first and second pump means associated with said drive and driven shafts, respectively, comprising means including manually shiftable selector means having a neutral position and shiftable from said neutral position to provide for the delivery of fluid under pressure to said torque transmitting means to control selectively the actuation of the latter to effect said high or low ratio drive, means including manually operable throttle controlled means adapted in a predetermined position of said throttle controlled means for conditioning said brake means for operation when said selector means is positioned to effect said high or low ratio drive, and said throttle controlled means being adapted in a second predetermined position thereof for effecting delivery of fuel from the pump means driven by said driven shaft for effecting control of said first means to effect a change from high ratio drive to low ratio drive.

48. For use with a vehicle having a transmission comprising gear means providing low and high ratio drives between drive and driven shafts thereof in the forward movement of said vehicle, fluid pressure responsive torque transmitting means associated with said gear means for selectively effecting said low or high ratio drive through the latter, and brake means adapted to be conditioned selectively for operation to prevent breaking of the driving connection between said drive and driven shafts in the actuation of said torque transmitting means in effecting low to high ratio drive, or vice versa, through said gear means, control means having connection with fluid under pressure adapted to be delivered by pump means driven by said driven shaft during forward movement of said vehicle comprising, means for selectively effecting delivery of fluid under pressure to said torque transmitting means to effect selectively said low or high ratio drive, and means for conducting fluid under pressure to said brake means to condition the same for operation in effecting a shift from low to high ratio drive, or vice versa, when said vehicle is moving forwardly.

49. For use with a vehicle having a transmission comprising gear means providing low and high ratio drives between drive and driven shafts thereof in the forward movement of said vehicle, fluid pressure responsive torque transmitting means associated with said gear means for selectively effecting said low or high ratio drive through the latter, and brake means adapted to be conditioned selectively for operation to prevent breaking of the driving connection between said drive and driven shafts in the actuation of said torque transmitting means in effecting low to high ratio drive, or vice versa, through said gear means, control means having connection with fluid under pressure adapted to be delivered by pump means driven by said driven shaft driving forward movement of said vehicle comprising, first passageway means for conducting fluid under pressure to said torque transmitting means to effect said low ratio drive, second passageway means for conducting fluid under pressure to said torque transmitting means to effect said high ratio drive, selection means for selectively opening and closing said first and second passageways to selectively actuate said transmission to effect said low or high ratio drive, third fluid passageway means for conducting fluid under pressure to said brake means to condition the same for operation in effecting a shift from low to high ratio drive, or vice versa, when said vehicle is moving forwardly.

WOODROW A. HASBANY.

REFERENCES CITED

The following references are of record in the file of this patent:

UNITED STATES PATENTS

| Number | Name | Date |
|---|---|---|
| 2,071,292 | Woodson | Feb. 16, 1937 |
| 2,100,810 | Liverance | Nov. 30, 1937 |
| 2,136,971 | Fleischel | Nov. 15, 1938 |
| 2,256,440 | Meyer | Sept. 16, 1941 |
| 2,318,481 | Greenlee | May 4, 1943 |
| 2,322,411 | Barkeij | June 22, 1943 |
| 2,332,593 | Nutt | Oct. 26, 1943 |
| 2,349,410 | Normanville | May 23, 1944 |
| 2,407,289 | La Brie | Sept. 10, 1946 |